(12) United States Patent
Kim et al.

(10) Patent No.: US 12,143,524 B2
(45) Date of Patent: Nov. 12, 2024

(54) MOBILE TERMINAL

(71) Applicant: LG ELECTRONICS INC., Seoul (KR)

(72) Inventors: Dongjin Kim, Seoul (KR); Namyong Kim, Seoul (KR); Sungwon Kim, Seoul (KR); Jihun Ha, Seoul (KR); Youngbae Kwon, Seoul (KR); Minsoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/555,807

(22) PCT Filed: Apr. 19, 2021

(86) PCT No.: PCT/KR2021/004866
§ 371 (c)(1),
(2) Date: Oct. 17, 2023

(87) PCT Pub. No.: WO2022/225071
PCT Pub. Date: Oct. 27, 2022

(65) Prior Publication Data
US 2024/0214478 A1    Jun. 27, 2024

(51) Int. Cl.
*H04M 1/02* (2006.01)
*H01Q 1/24* (2006.01)
(52) U.S. Cl.
CPC ....... *H04M 1/0268* (2013.01); *H04M 1/0235* (2013.01); *H04M 1/0262* (2013.01); *H04M 1/0269* (2022.02); *H01Q 1/243* (2013.01)
(58) Field of Classification Search
CPC ............ H04M 1/0268; H04M 1/0269; H04M 1/0235; H04M 1/0262; H01Q 1/243
See application file for complete search history.

(56) References Cited

U.S. PATENT DOCUMENTS 10,601,968 B1 *  3/2020  Koh .................... H04M 1/0222
10,904,371 B1    1/2021  Song et al.
(Continued)

FOREIGN PATENT DOCUMENTS

KR   1020000031077   6/2000
KR   10-2006-0075856   7/2006
(Continued)

OTHER PUBLICATIONS

PCT International Application No. PCT/KR2021/004866, Written Opinion and International Search Report dated Jan. 11, 2022, 13 pages.

(Continued)

*Primary Examiner* — Lewis G West
(74) *Attorney, Agent, or Firm* — LEE, HONG, DEGERMAN, KANG & WAIMEY

(57) ABSTRACT

Provided is a mobile terminal comprising: a first frame; a second frame which slidingly moves with respect to the first frame in a first direction to switch to an extended mode and includes a ground metal, a first side metal, and a second side metal; a display part which includes a fixed portion coupled to the front surface of the first frame and a variable portion bent to surround the second frame; a rolling hinge which is coupled to the rear surface of the variable portion and comprises a conductive material; and a ground pin which is coupled to the rolling hinge, wherein the ground pin is brought into contact with the ground metal in the extended mode to electrically connect the rolling hinge to the ground metal.

16 Claims, 23 Drawing Sheets

(56) References Cited

U.S. PATENT DOCUMENTS

| | | | |
|---|---|---|---|
| 11,940,847 B2* | 3/2024 | Yoon | G09F 9/30 |
| 2019/0261519 A1* | 8/2019 | Park | G06F 3/04886 |
| 2020/0119429 A1 | 4/2020 | Park et al. | |
| 2021/0337054 A1* | 10/2021 | Choi | H01Q 5/20 |
| 2022/0075418 A1* | 3/2022 | Song | G06F 1/1656 |
| 2022/0078270 A1* | 3/2022 | Song | G06F 1/1652 |
| 2022/0166861 A1* | 5/2022 | Lim | G06F 1/1681 |
| 2022/0166865 A1* | 5/2022 | Seol | H04M 1/0268 |
| 2022/0171434 A1* | 6/2022 | Park | G06F 1/1698 |
| 2023/0152865 A1* | 5/2023 | Park | G06F 1/1698 |
| | | | 361/679.27 |
| 2023/0283697 A1* | 9/2023 | Kim | G09F 9/30 |
| | | | 455/575.4 |
| 2023/0384822 A1* | 11/2023 | Lee | G06F 1/1681 |
| 2023/0421674 A1* | 12/2023 | Park | H04M 1/0268 |
| 2024/0047858 A1* | 2/2024 | Cho | H04M 1/0216 |
| 2024/0063528 A1* | 2/2024 | Seol | H04M 1/0216 |

FOREIGN PATENT DOCUMENTS

| | | |
|---|---|---|
| KR | 1020090130445 | 12/2009 |
| KR | 10-2015-0025356 | 3/2015 |
| KR | 10-2017-0073964 | 6/2017 |
| KR | 10-2019-0143029 | 12/2019 |
| KR | 10-2020-0073083 | 6/2020 |
| KR | 10-2021-0040699 | 4/2021 |

OTHER PUBLICATIONS

Korea Patent Office Application Serial No. 10-2023-7034935, Search Report dated Dec. 18, 2023, 8 pages.
Korean Intellectual Property Office Application No. 10-2023-7034935, Notice of Allowance dated Jun. 10, 2024, 8 pages.

\* cited by examiner (a)

(b)

(a)  (b)

(a)

(b)

$$d \ll \lambda_g/4 \,(@\, f_h)$$

$$\lambda_g = \frac{1}{f\sqrt{\mu\varepsilon}} = \frac{1}{f\sqrt{\mu\varepsilon_0\varepsilon_r}}$$

Free Space : $\lambda/4 = 23\text{mm}\,(@\, 3.5\text{GHz})$
If $\varepsilon_r = 3$ : $\lambda_g/4 = 23 \times \frac{1}{\sqrt{3}} \simeq 13.3\text{mm}$
$d \ll 13.3\text{mm}$ (a)

(b)

(a)

(b)

(a)

(b)

(a)

(b)

MOBILE TERMINAL

CROSS-REFERENCE TO RELATED APPLICATION(S)

This application is the National Stage filing under 35 U.S.C. 371 of International Application No. PCT/KR2021/004866, filed on Apr. 19, 2021, the contents of which are all hereby incorporated by reference herein in its entirety.

TECHNICAL FIELD

The present disclosure relates to a mobile terminal having a flexible display unit capable of increasing the size of a screen by moving in a sliding manner.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

In order to implement various functions, an area of a display unit should be increased, but a size of a mobile terminal should be reduced considering its portability. In order to satisfy the two properties contrary to each other, a bezel located around the display unit was minimized to fill up a front side with the display unit.

Furthermore, there is a need for a mobile terminal that can be easily carried and used by changing a size of the mobile terminal in a manner of varying the size of the mobile terminal.

This trend is accelerating due to the recent emergence of a flexible display unit. However, it is necessary to solve the problem of deteriorating usability due to configuration that is different from the existing form factors.

DISCLOSURE

Technical Problem

An object of a mobile terminal according to an embodiment of the present disclosure devised to solve the above-described problems is to provide a structure capable of stably supporting an extended display unit without sagging.

Another object of the present disclosure is to improve usability by preventing a large shift of the center of gravity due to a change in the shape of the mobile terminal, and by preventing a lopsided shift.

Technical Solution

Provided herein is a mobile terminal including a first frame, a second frame slidably movable in a first direction with respect to the first frame to switch to an extended mode, or in a second direction to switch to a default mode, the second direction being opposite to the first direction, a display unit including a fixed part coupled to a front surface of the first frame and a variable part bending around the second frame, a rolling hinge coupled to a back surface of the variable part, the rolling hinge containing a conductive material, a ground pin coupled to the rolling hinge, and a wireless communication module configured to transmit and receive wireless signals, wherein the second frame includes a ground metal supporting a back surface of the rolling hinge, a first side metal defining an outer appearance in a third direction perpendicular to the first direction and a fourth direction opposite to the third direction, and a bottom frame covering a curved portion of the display unit, the bottom frame including a second side metal, wherein at least one of the first side metal and the second side metal is connected to the wireless communication module to transmit or receive the wireless signals, wherein the ground pin contacts the ground metal in the extended mode to electrically connect the rolling hinge and the ground metal.

The rolling hinge may include a plurality of metal bars extending in the third direction, a hinge edge disposed at both ends of each of the metal bars, a first slide hook protruding from the hinge edge, a rolling sheet disposed between the plurality of metal bars and the display unit, and an adhesive sheet disposed to attach the display unit to the rolling sheet, wherein the second frame further may include a slide rail disposed between the ground metal and the first side metal, the first slide hook being movably inserted into the slide rail, wherein the slide rail may include a non-conductive material.

The slide rail may include a POM material.

The adhesive sheet may include an insulating material.

The rolling hinge may include a slide frame disposed at an end of the variable part to slidably move on a back surface of the second frame, wherein the ground pin may be coupled to a front surface of the slide frame.

The mobile terminal may further include a second slide hook provided on one side of the ground pin to move along the slide rail.

The rolling sheet may include a plurality of slits extending in the third direction, wherein a width of the slits may increase at the curved portion of the display unit.

The ground pin may include an elastic part configured to be compressed when the ground pin contacts the ground metal in the extended mode.

The mobile terminal may further include a signal connecting part arranged to electrically connect a part mounted on the first frame and a part mounted on the second frame, wherein the ground pin may contact the signal connecting part in the default mode, wherein a coating on a surface of the signal connecting part in contact with the ground pin may be removed.

The mobile terminal may further include a battery seated in the ground metal, wherein the ground pin may be disposed on a side of the battery facing in the third direction.

The mobile terminal may further include an auxiliary board disposed on the side of the battery facing in the third direction, wherein the ground pin may be disposed on a backside of the auxiliary board.

The ground metal may include a sliding metal disposed on the back surface of the rolling hinge in the extended mode, a board seat allowing the auxiliary board to be seated thereon, and a battery cover arranged to cover a back surface of the battery, wherein a thicknesswise distance between the sliding metal and the rolling hinge may be shorter than a thicknesswise distance between the board seat and the rolling hinge.

The mobile terminal of claim 1, may further include a screw passing through an overlap of the first side metal and the second side metal, and a connection clip disposed between the first side metal and the second side metal in the overlap, wherein the first side metal and the second side metal constitute a first antenna.

A distance from the connection clip to an end of the overlap may be shorter than a quarter wavelength of a highest frequency signal among signals radiated by the first antenna.

The bottom frame further may include a third side metal compartmentalized by the second side metal and a slit, wherein a length of the third side metal may be less than a length of the first antenna.

One end of the second side metal may be disposed in the third direction and an opposite end of the second side metal may be disposed in the first direction such that a corner of the mobile terminal is disposed.

Advantageous Effects

In a mobile terminal according to one embodiment of the present disclosure, the antenna may be stably driven regardless of the state of the mobile terminal.

Further, an elastic portion of a ground pin may provide tension to keep the display unit in a flat state in an extended mode.

In addition, as a mobile terminal is extended, displacement of center of gravity can be minimized since inner components are distributed instead of being concentrated on one side. Since the center of gravity does not move upward, a user can stably use the mobile terminal in the extended state.

In addition, it is possible to reduce the inflow of foreign materials into the interior of a mobile terminal by minimizing the exposure of components to an extended part in an extended state of the mobile terminal.

In addition, the mobile terminal of the present disclosure may increase usability in the extended state by minimizing the height difference at the outer surface of the mobile terminal that occurs when the mobile terminal is extended.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
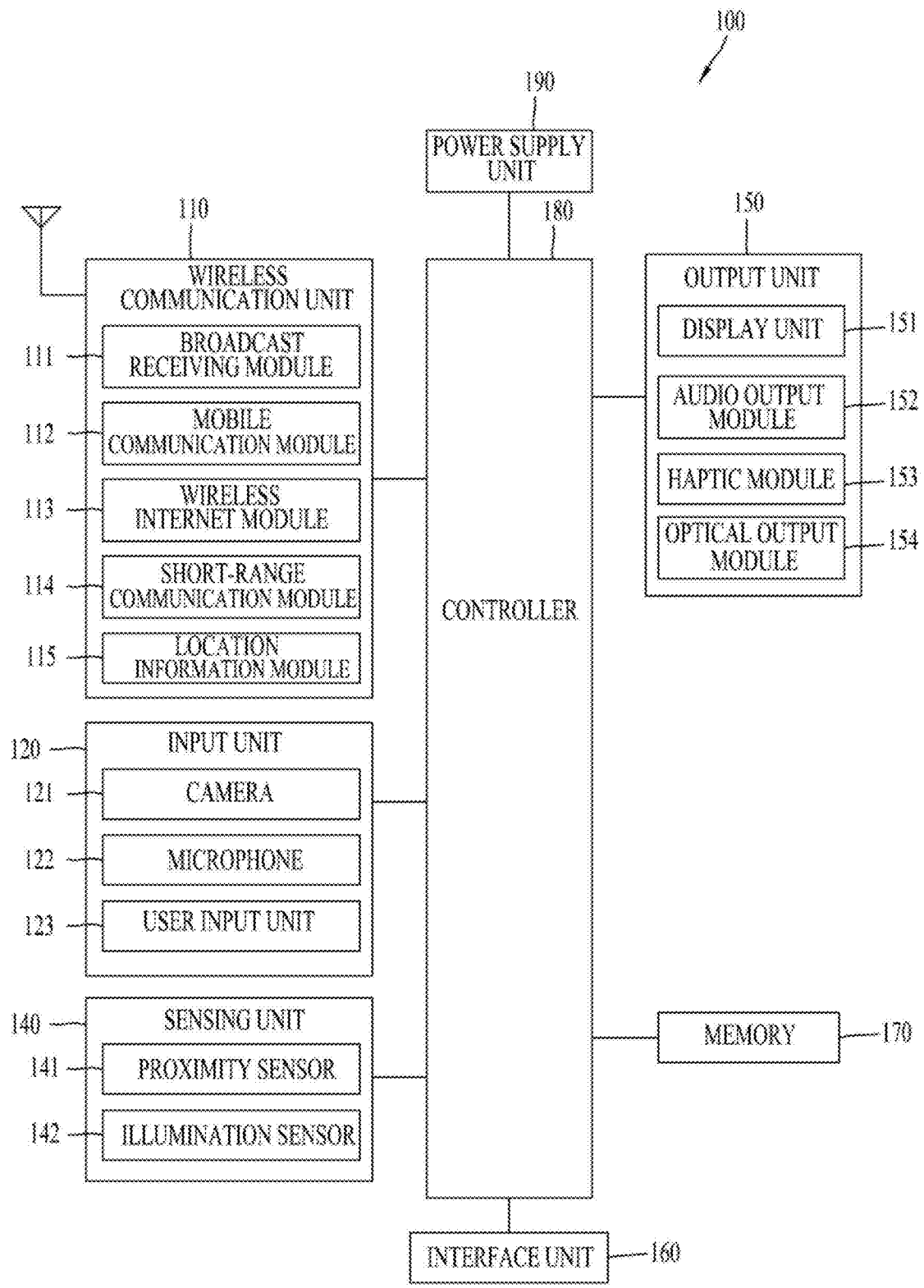
FIG. 1 is a block diagram of a mobile terminal in accordance with the present disclosure.

FIG. 1 is a block diagram of a mobile terminal in accordance with the present disclosure. The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
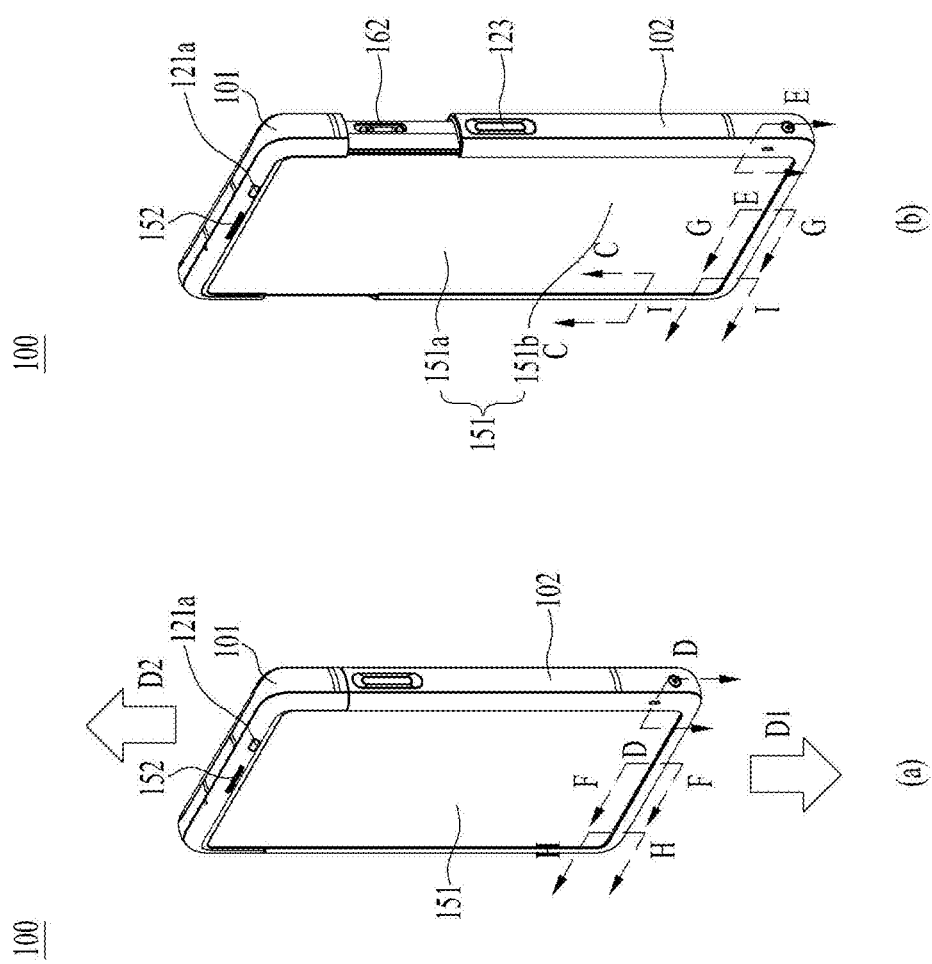
FIG. 2 is a front view of a first state and a second state of a mobile terminal.
Figure 3:
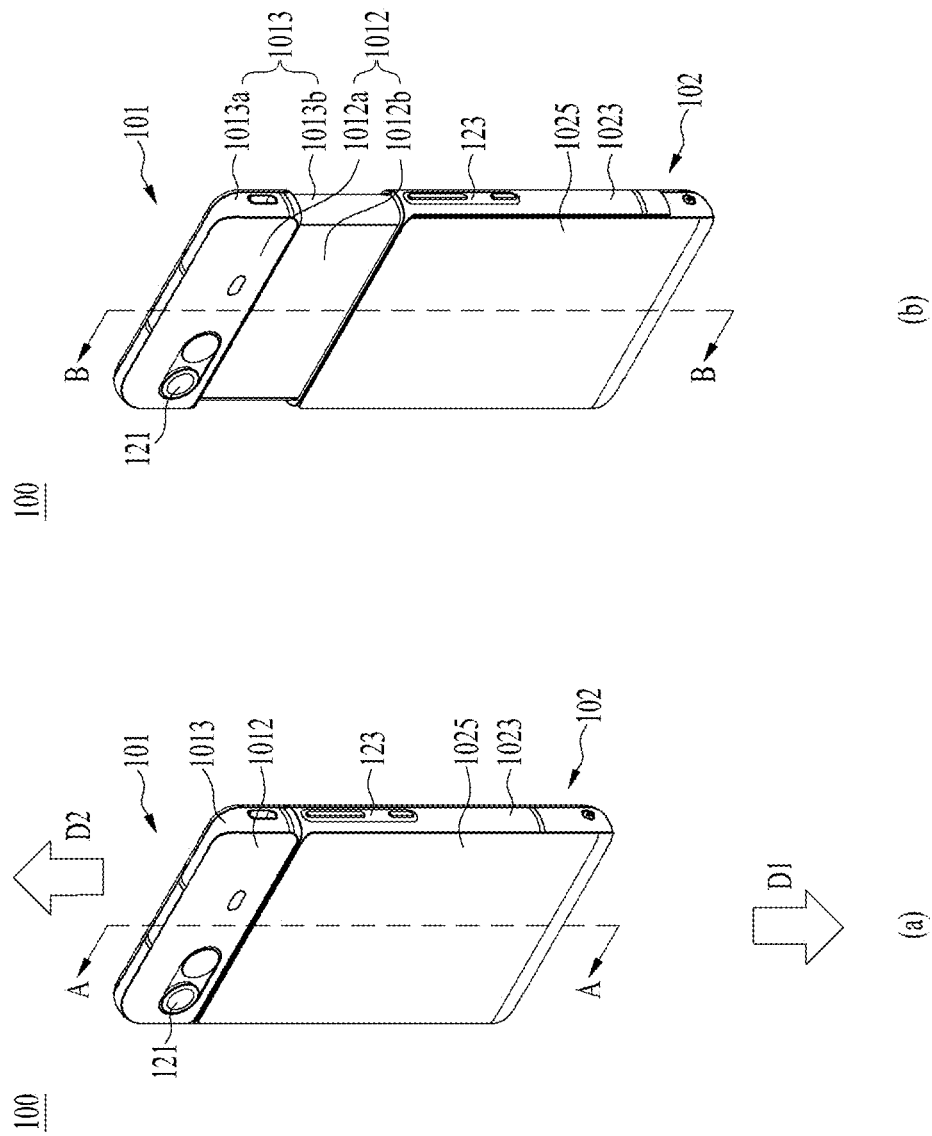
FIG. 3 is a rear view illustrating a first state and a second state of a mobile terminal.

FIGS. 2 and 3 are diagrams showing the mobile terminal 100 that may be varied in size, FIG. 2 is a front view of a first state and a second state of the mobile terminal 100, and FIG. 3 is a rear view illustrating the first state and the second state of the mobile terminal 100. The mobile terminal 100 includes frames 101 and 102 that slide such that the size of the mobile terminal 100 may be changed. A first frame 101 and a second frame 102 that slides relative to the first frame 101 are included. When the second frame 102 moves in a first direction D1, a state of the mobile terminal 100 is switched to an extended mode (a second state). In addition, when the second frame 102 moves in a second direction opposite to the first direction, the state of the mobile terminal 100 is switched to a basic mode (a first state).

The movement of the second frame 102 is a movement relative to the first frame 101. If the second frame 102 becomes a reference, when the first frame 101 slides in the second direction D2, the mobile terminal 100 switches to the second state extended. When the first frame 101 slides in the first direction D1, the mobile terminal 100 switches to the first state contracted.

If the first frame 101 and the second frame 102 are disposed in top-bottom direction like the present embodiment, a user holds the second frame 102 located at the bottom, so the first frame 101 moves in top direction from the user's perspective. Hence, the mobile terminal 100 may be recognized as extended upward.

In the following description, the direction in which the mobile terminal 100 and the display unit 151 thereof are extended or enlarged is defined as a first direction, and the direction in which the mobile terminal contracts or retracts or is reduced to switch from the second state to the first state is defined as a second direction. A direction perpendicular to the first and second directions is defined as a third direction. Description will be made on the assumption that the first and second directions are horizontal directions and the third direction is a vertical direction. However, depending on the arrangement of the mobile terminal 100, the first and second directions may be vertical directions and the third direction may be a horizontal direction.

(a) in FIG. 2 and (a) in FIG. 3 show the basic mode that is the contracted state, and (b) in FIG. 2 and (b) in FIG. 3 show the extended mode state that is the extended state. Even in the extended mode switched as the second frame 102 moves in the first direction, the first frame 101 and the second frame 102 have an overlapping portion.

In the first state, one of the first frame 101 and the second frame 102 may be disposed to surround the other and be disposed outward of the other. The first frame 101 may be disposed outward of the second frame 102 in some embodiments, and the second frame 102 may be disposed outward of the first frame 101 in some embodiments.

In order to extend the mobile terminal 100 while the second frame 102 moves against the first frame 101, the first and second frames 101 an 102 partially overlap each other. At least one side of the first frame 101 and the second frame 102 may include a portion configured to remain inside in the basic mode of the mobile terminal 100 and be exposed externally in the extended state of the mobile terminal 100. A backside and lateral side of the mobile terminal 100 may include portions configured to be selectively exposed in part on switching to the second state or located inside of another member in the first state. In the present embodiment, the portion of the second frame exposed externally is fixed and the first frame 101 may include a portion always exposed externally and a portion selectively exposed.

As shown in FIG. 2 (b), an extended front side of the mobile terminal in the second state extended is covered by the display unit 151 so that an inside of the mobile terminal 100 is not exposed.

An area of the display unit 151 located on the front side of the mobile terminal 100 may vary depending on whether the frame 101 and 102 of the mobile terminal 100 is extended. A front side area of the display unit 151 in the second state may have a size greater than that in the first state. The display unit 151 includes a fixed part 151a fixed to the front side of the first frame 101 so as to be always located on the front side of the mobile terminal irrespective of the state of the mobile terminal 100 and a variable part 151b located on the front side or the backside depending on whether the mobile terminal 100 is extended.

The fixed part 151a is always located on the front side by being coupled to the front side of the first frame 101 of the display unit 151, thereby configuring a portion of the front part. As the fixed part 151a is fixed to the first frame 101, it is characterized in maintaining a uniform shape without changing flexibility. On the other hand, the variable part 151b means a portion at which an angle of a flexed portion varies or a portion at which a location of a flexed portion is changed. In the second state of the mobile terminal, as the variable part moves to a front side, the fixed part and the variable part simultaneously located at the front part.

The variable part 151b includes a lateral part located in a lateral direction of the mobile terminal 100, and a location of the lateral part varies depending on a location of the second frame 102. Based on the lateral part, a size of a region located on the front side and a size of a region located on the backside are changed. Some of the variable part 151b may become the front part or the backside part depending on the first or second state.

Based on the mobile terminal 100, the variable part 151b is located in the first direction to the fixed part 151a and an end portion of the variable part 151b is bent in a direction of the backside of the mobile terminal 100 and slides to move on the backside of the second frame 102.

As such, a flexible display unit 151 which is bendable may be used as the display unit such that the position of the display unit may move to front side or rear side. The flexible display unit 151 may be a display unit capable of maintaining a flat state like a conventional flat panel display and capable of warping, bending, folding, twisting, or rolling like paper. The flexible display unit 151 refers to a display which is manufactured on a thin and flexible substrate and is thus lightweight and robust as not to be easily broken. The flexible display unit according the present disclosure may be bent in a specific direction, and may be arranged such that the curvature thereof may change in the first direction.

In addition, an electronic paper is a display technology to which properties of general ink are applied. The electronic paper may be different from the conventional flat panel display in using reflected light. The electronic paper may change information using a twisted ball or electrophoresis using a capsule. In a state in which the flexible display unit 151 is not deformed (e.g., a state of having an infinite curvature radius, hereinafter referred to as a basic state), a display area of the flexible display unit 151 becomes flat. In a state in which the flexible display unit 151 is deformed by an external force from the basic state (e.g., a state of having a finite radius of curvature, hereinafter referred to as a deformed state), the display area may become a curved face. As shown, information displayed in the deformation state may be visual information output on the curved face. Such visual information is implemented by independently controlling light emission of sub-pixels arranged in a matrix. The sub-pixel refers to a minimum unit for implementing one color. When external force is applied to the flexible display unit 151, the flexible display unit 151 may be deformed to switch from the default state, which is the flat state, to a bent state, which is not the flat state.

The flexible display unit 151 may be combined with a touch sensor to implement a flexible touch screen. When a touch is made on the flexible touch screen, the controller 180 (see FIG. 1) may perform control corresponding to such touch input. The flexible touch screen may be configured to detect the touch input in the deformed state as well as in the basic state.

The touch sensor detects the touch (or touch input) applied on the touch screen using at least one of various touch schemes such as a resistive film scheme, a capacitance scheme, an infrared scheme, an ultrasonic wave scheme, a magnetic field scheme, and the like.

As an example, the touch sensor may be configured to convert a change in pressure applied on a specific portion of the touch screen, capacitance generated at the specific portion, or the like into an electrical input signal. The touch sensor may be configured such that a touch object applying a touch on the touch screen may detect touched position and area on the touch sensor, a pressure during the touch, a capacitance during the touch, and the like.

Further, the mobile terminal 100 may have a deformation detection means for detecting the deformation of the flexible display unit 151. Such deformation detection means may be included in the sensing unit 140 (see FIG. 1).

The deformation detection means may be disposed in the flexible display unit 151 or a case (first to second frames 101 to 102 to be described later) to detect information related to the deformation of the flexible display unit 151. In this connection, the information related to the deformation may include a direction in which the flexible display unit 151 is deformed, a degree of the deformation, a deformed position, a deformed time, an acceleration at which the deformed flexible display unit 151 is restored, and the like. In addition, the information related to the deformation may include various kinds of information that may be detected due to the bending of the flexible display unit 151.

In addition, the controller 180 may change information displayed on the flexible display unit 151 or generate a control signal for controlling a function of the mobile terminal 100 based on the information related to the deformation of the flexible display unit 151 detected by the deformation detection means.

The deformation of the flexible display unit 151 may vary depending on the positions of the first frame 101 and the second frame 102. As shown in FIG. 2, since the bending position on the flexible display unit 151 is determined according to the positions of the first frame and the second frame, the bending deformation position of the flexible display unit 151 and the area thereof positioned on the front may be calculated based on the positions of the first frame 101 and the first frame 102 in place of the deformation detection means of the flexible display unit 151.

The state conversion (first or second state) of the flexible display unit 151, i.e., the size change at the front and rear faces of the mobile terminal 100 of the display unit 151 based on the size change of the mobile terminal 100 may be performed manually by a force applied by the user, but may be not limited to such manual scheme. For example, when the mobile terminal 100 or the flexible display unit 151 is in the first state, the mobile terminal 100 or the flexible display unit 151 may be converted into the second state by the user or an application command without the external force applied by the user. As such, in order for the flexible display unit 151 to be automatically deformed without the external force, the mobile terminal 100 may include a driving unit 200, which will be described later.

The flexible display unit 151 of the present disclosure is bent 180 degrees by rolling around a side portion of the mobile terminal 100 facing in the first direction. Accordingly, based on the side portion of the mobile terminal 100, a part of the flexible display unit 151 is disposed on the front of the mobile terminal 100, and the other part of the flexible display unit 151 is disposed on the rear of the mobile terminal 100. For simplicity, the part of the flexible display unit 151 positioned on the front is called a front face, and the other part of the flexible display unit 151 positioned on the rear is called a rear face. As illustrated in FIG. 2, the mobile terminal may extend in the first direction or contract in the second direction opposite to the first direction. In this case, the area of the flexible display unit 151 positioned on the front changes. That is, the sizes of the front face and the rear face may be changed according to a change in the state of the mobile terminal.

In addition, the flexible display unit 151 may be rolled on or released at the side portion in the first direction of mobile terminal. Accordingly, the rear face of the display unit 151 moves, so that the size of the front face of the display unit 151 may be adjusted. Since the size of the flexible display unit 151 is determined and the flexible display unit 151 is formed of one continuous body, an area of rear face of the display unit 151 decreases as an area of the front face of the display unit 151 increases. Such a display unit 151 may be rolled in a second frame 102, which is movable relative to a first frame 101 to be described later, more correctly, on one of sides of the second frame 102. The display unit 151 may be withdrawn or pulled out from or inserted or pushed into the second frame 102 while being rolled in the second frame 102 along a moving direction of the second frame 102 to adjust the area of the display unit 151 on the front face of the mobile terminal 100.

Since the variable part 151b is flexible, it needs a support structure on its backside to maintain a flat state. To support the backside of the variable part 151b, further includes is a rolling hinge capable of maintaining a flat state of the variable part 151b as well as enabling flex deformation of the variable part 151b.

Figure 4:
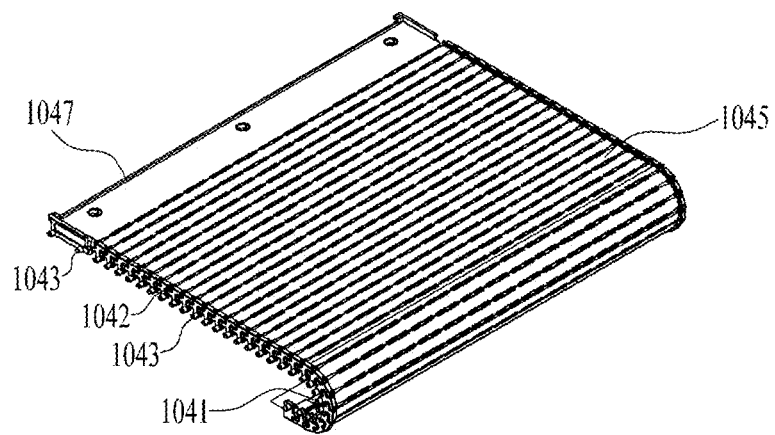
FIG. 4 is a view illustrating a rolling hinge of a mobile terminal.
Figure 4:
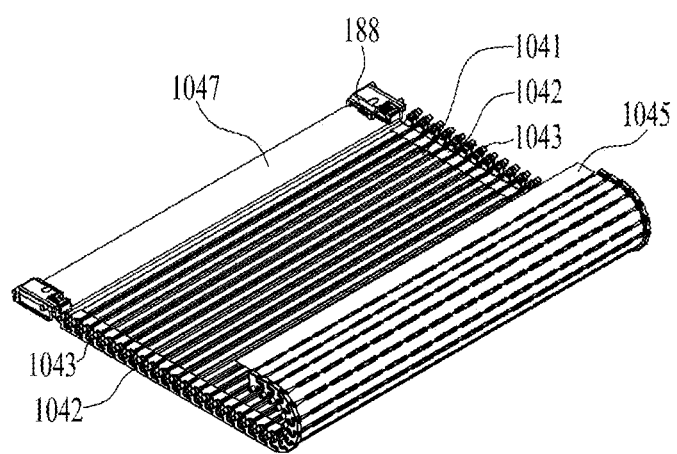

FIG. 4 is a diagram illustrating a rolling hinge 104 located on the back surface of the variable part 151b, in which (a) is a view seen on the front side, and (b) is a view seen on the back side. The rolling hinge 104 is located on the back surface of the variable part 151b of the display unit 151 and may support the variable part such that the variable part bends in a first direction, but not in a third direction perpendicular to the first direction, and remains flat. The rolling hinge 104 may include multiple metal bars 1041 (see FIG. 21) extending in the third direction. The metal bars 1041 may be arranged side-by-side in the first direction. The rolling hinge 104 may bend along with the variable part 151*b* by changing the angle between the metal bars 1041. Hinge edges 1042 (see FIG. 21) located at both ends of the metal bars 1041 may have a larger cross section than that of the metal bars 1041 to protect the side edges of the display unit. A slide hook 1043 (see FIG. 21) protruding from the hinge edge 1042 may move along a slide rail 1027 (see FIG. 20) formed on the second frame 102. The slide hook 1043 and the slide rail 1027 may guide the slide movement of the display unit 151 according to movement of the second frame 102.

The end of the variable part 151*b* of the display unit 151 is coupled to a slide frame 1047, which slides on the back surface of the second frame 102. The slide frame 1047 may be regarded as a metal bar 1041 located at the end among the metal bars 1041 of the rolling hinge 104, and moves with the display unit 151 according to the slide movement of the variable part like the metal bars 1041.

However, the slide frame 1047 always slides on the back surface of the mobile terminal and does not move to the front surface. Therefore, the width of the slide frame 1047 may be greater than that of the metal bar 1041.

The slide frame 1047 may equally include a slide hook located at an end of the metal bar 1041. Since the width of the slide frame 1047 is greater than that of the metal bar 1041, the slide frame may include multiple slide hooks 1043. When the second frame 102 moves in the first direction, the slide frame also moves on the second frame 102 in the first direction. As a result, the travel distance of the slide frame 1047 with respect to the first frame 101 is twice the travel distance of the slide frame 1047 with respect to the second frame 102.

A rolling sheet 1045 is positioned between the metal bars 1041 and the display unit 151 and may include a cuff pattern composed of multiple slits extending in the third direction to facilitate deformation in the first direction. The slits extending in the third direction are staggered, and the cuff pattern allows only bending deformation in the first direction while limiting deformation in the third direction. The cuff pattern may be disposed at locations corresponding to the metal bars 1041 as shown in FIG. 4.

The rolling sheet 1045 is in contact with the multiple metal bars 1041, including the slide frame 1047. Accordingly, the entire rolling hinge 104 is electrically connected. The rolling sheet 1045 is a part that directly contacts the display unit 151, and an adhesive sheet may be interposed between the display unit 151 and the rolling sheet 1045 to couple the rolling hinge 104 to the variable part 151*b* of the display unit. The adhesive sheet may contain an insulating material to electrically isolate the rolling hinge 104 from the display unit 151.

The second frame 102 may include a roll bracket 1028 (see FIG. 6) including a curved surface inside. A location of the roll bracket 1028 is non-limited. Yet, the roll bracket 1028 may be disposed at a first direction end portion of the second frame 102 to provide a maximum-size screen to a front side. Such a roll bracket 1028 may have a bar shape extended in the third direction vertical to the first direction and including a curved surface so as to have the display unit 151 wound thereon.

In addition to prevent the breakage of the display unit 151 wound around the roll bracket 1028, a bottom frame 1024 disposed at the first direction end portion of the second frame 102 may be included.

The bottom frame 1024 covers a curved side portion of the display unit 151 and may have a curved surface corresponding to a curved shape of the display unit 151. The bottom frame 1024 may include a part formed of a metal material and a part formed of an insulating material, wherein the part formed of a metal material may be used as an antenna.

Figure 5:
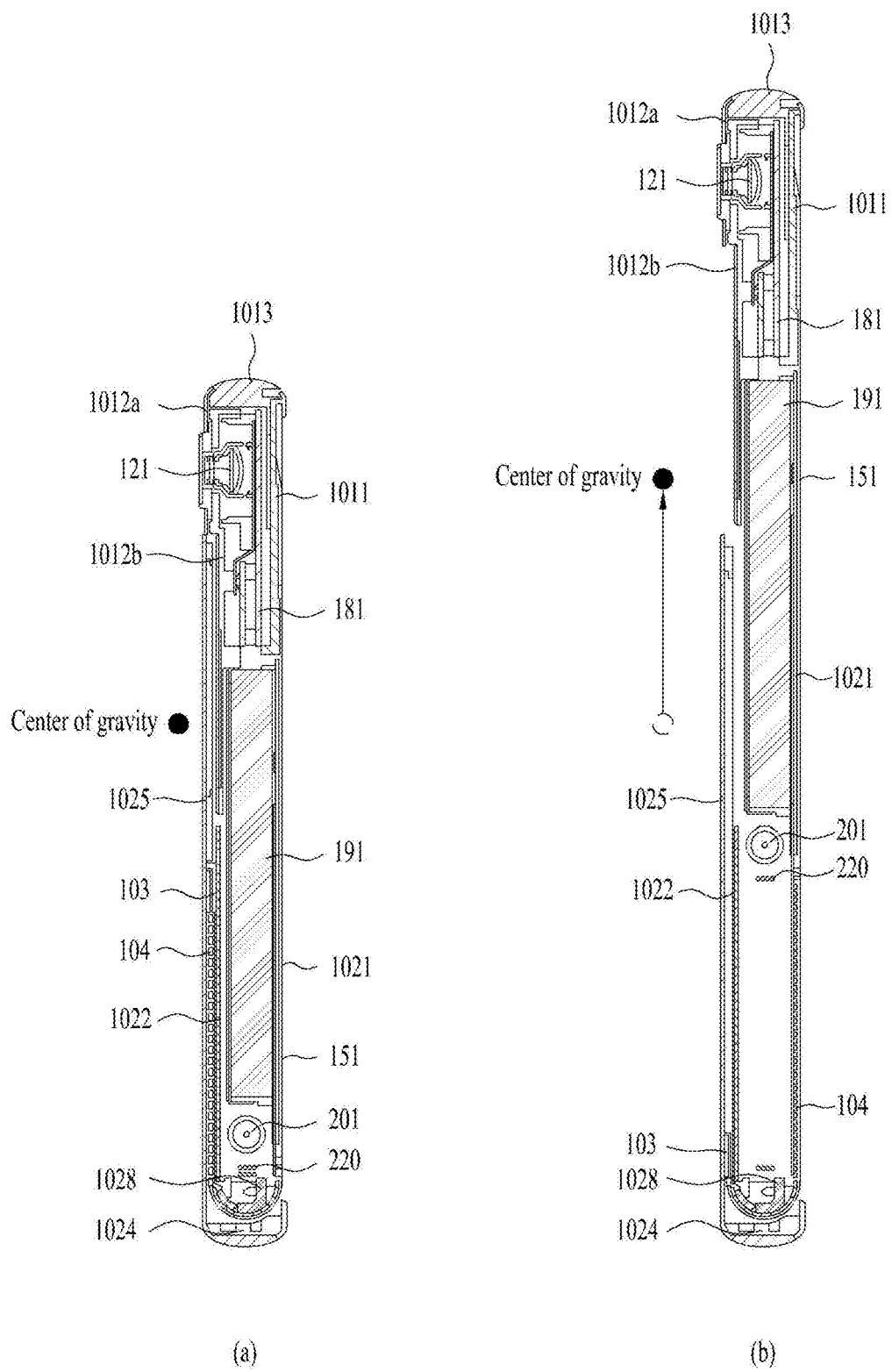
FIG. 5 is a side cross-sectional diagram of a mobile terminal according to one embodiment.
Figure 6:
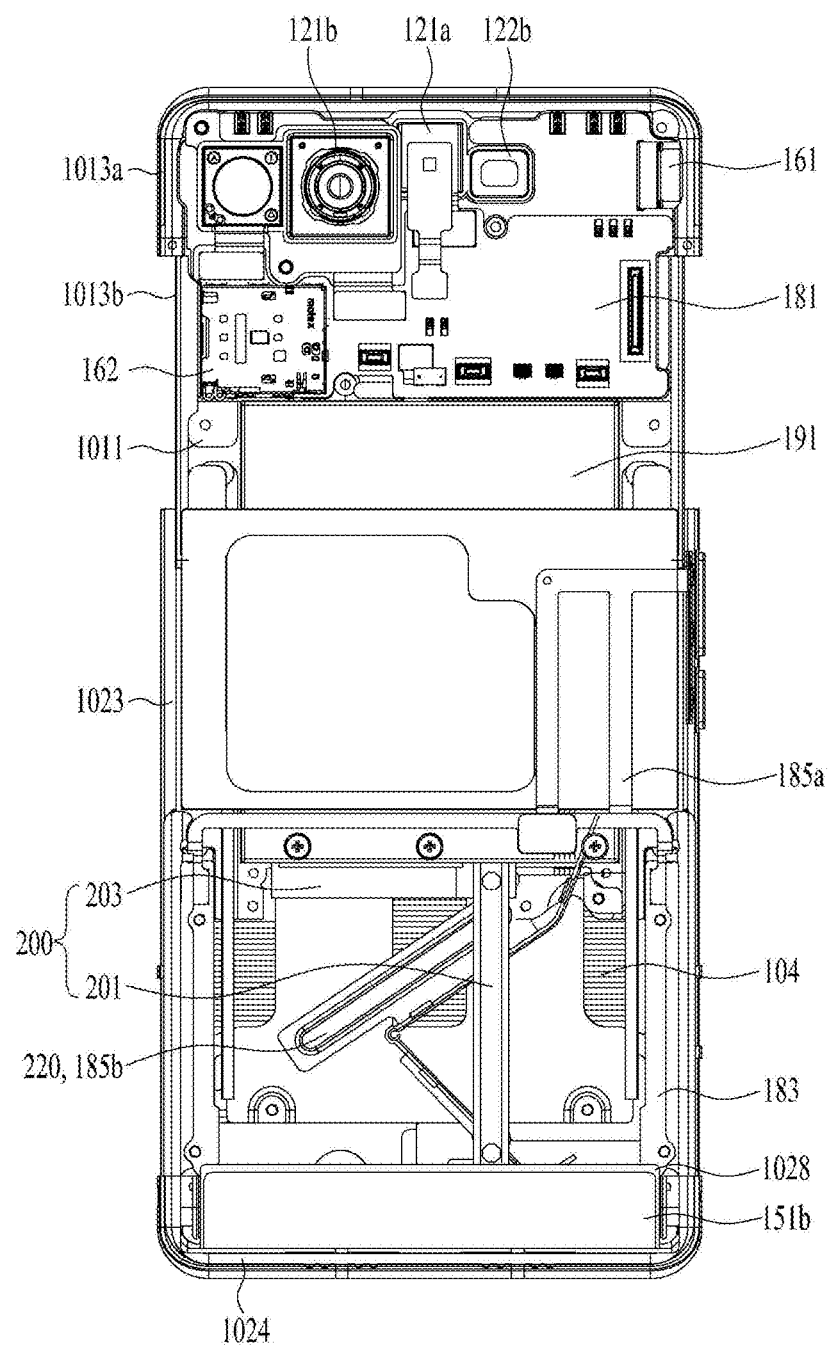
FIG. 6 is a backside diagram showing inner components in a second state of the embodiment shown in FIG. 5.

FIG. 5 is a lateral cross-sectional diagram according to one embodiment of the present disclosure and shows the cross-sections A-A and B-B of FIG. 3. FIG. 6 is a backside diagram showing inner components in the second state of the embodiment shown in FIG. 5. The present embodiment shows an example that the battery 191 is installed in the first frame 101. The battery 191 is located between a first front part 1011 and a first rear part 1012 of the first frame, and an open space in a bottom part of the first rear part 1012 may be covered via a rear cover 1025.

In case that the battery 191 is located in the first frame 101 Like the present embodiment, since most of the components are located in the first frame 101, the types of electronic components installed in the second frame 102 may limitedly include the lateral antenna, the user input unit 123, the coil antenna 114 on the backside and the like. Since the battery 191 and the main board 181 are located in the first frame 101 together, a signal connecting part 185*b* connecting the respective components can be configured more neatly.

According to the present embodiment, when the mobile terminal 100 switches to the second state, an empty space is formed under the battery 191. The second frame 102 enclosing the front and rear of the battery 191 moves in the first direction and supports the backside of the variable part 151*b* having moved forward. As an empty space is formed in the second frame 102 located on the backside of the variable part 151*b* in the second state, if a significant force is applied to a front side, flex deformation may occur. To increase bearing power of the second frame 102, a support link 220 unfolded in an extended portion may be further included. The support link 220 is folded in the first state to minimize an installation space or unfolded in the second state to reinforce the rigidity of the extended portion.

Since the battery 191 is located in the first frame 101, the drive unit 200 is located in the first direction rather than the battery 191 and may guide the slide movement between the first frame 101 and the second frame 102.

In the present embodiment, a drive motor 201 is located in the frame 101, a rack gear 203 is located in the second frame 102, and the rack gear 203 and the second frame 102 move in the first direction against the first frame 101. Since the drive motor 201 is disposed in a manner of being inclined to the first direction, the drive motor 201 and the rack gear 203 may be located in the first frame 101 and the second frame 102 in consideration of a moving space of the rack gear 203, respectively.

In case that the battery 191 is disposed in the first frame 101 like the present embodiment, most of the components are disposed in the first frame 101. Hence, there is an effect that center of gravity is inclined to one side when the mobile terminal 100 is extended. Particularly, in case that the first and second frames 101 and 102 are disposed in the top-bottom direction like the present disclosure, when the first frame 101 moves upward, as shown in FIG. 5 (*b*), the center of gravity moves upward. While a user holds the bottom (i.e., second frame) of the mobile terminal, if the center of gravity moves upward, the mobile terminal may be easily dropped from the user's hand.

To solve the above problem, components in a frame need to be disposed in a manner of being distributed in a second state to minimize the shift of center of gravity even in the second state.

Figure 7:
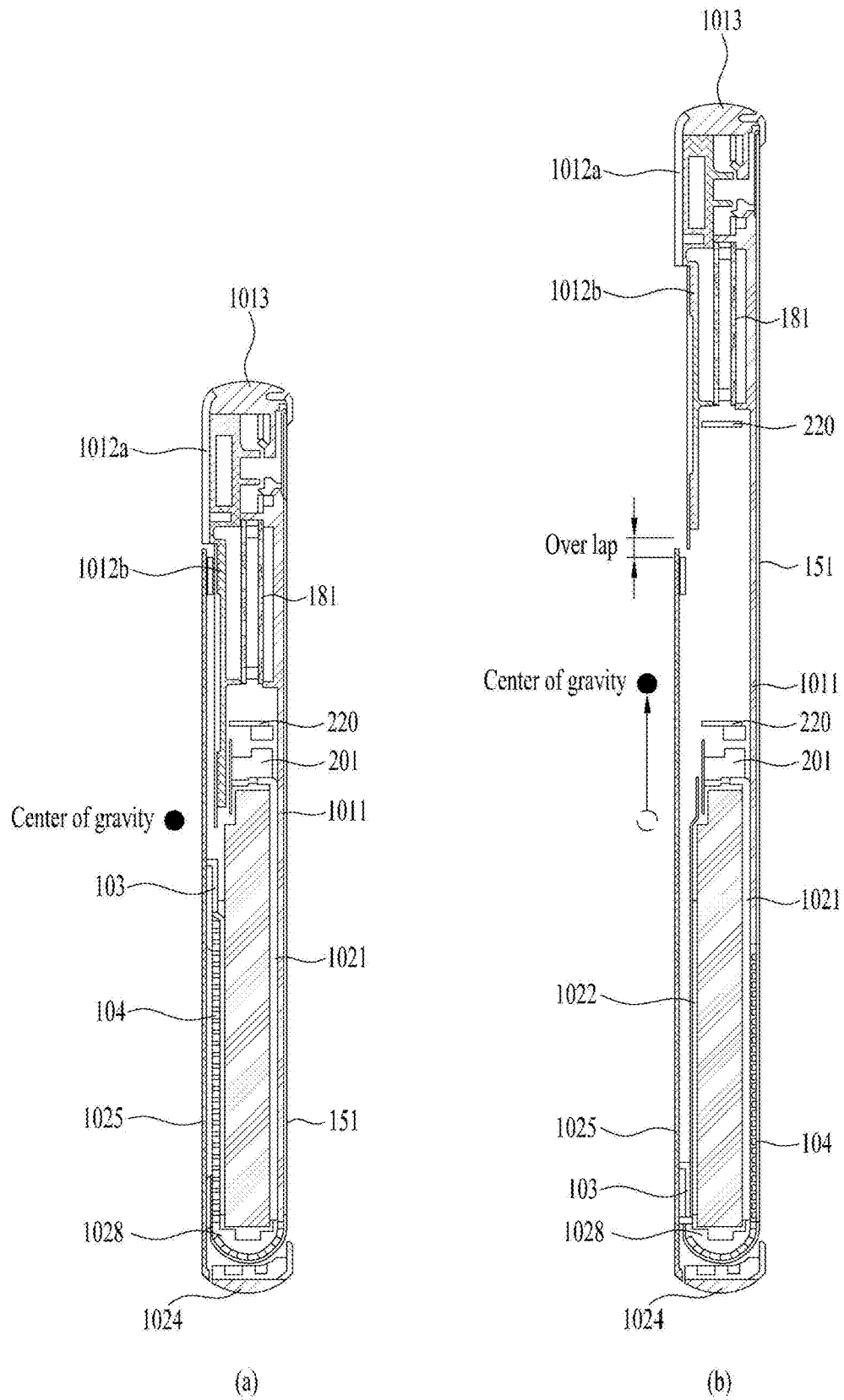
FIG. 7 is a side cross-sectional diagram of a mobile terminal according to another embodiment.
Figure 8:
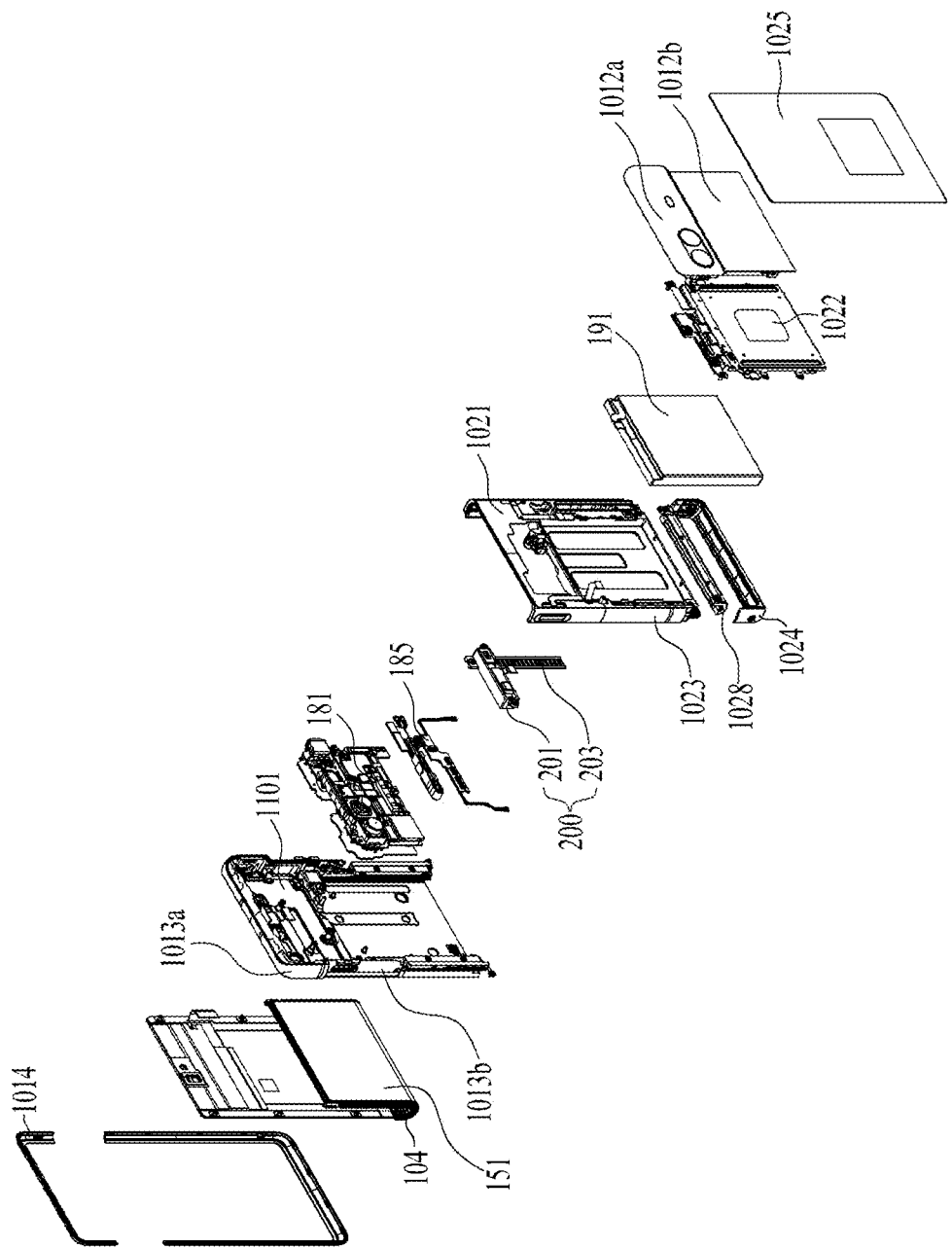
FIG. 8 is an exploded perspective diagram of a mobile terminal according to one embodiment.

As shown in FIG. 7, the battery 191 is disposed in the second frame of the mobile terminal 100, thereby minimizing the shift of center of gravity on switching to the second state. FIG. 7 shows another embodiment of the cross-sectional diagram of A-A and B-B shown in FIG. 3, and FIG. 8 is an exploded perspective diagram of the embodiment shown in FIG. 7.

The respective components of the mobile terminal 100 according to the present embodiment will be described in detail with reference to FIG. 7 and FIG. 8 as follows.

First of all, the first frame 101 includes a first front part 1011 located on a front side of the mobile terminal 100 to be coupled with the fixed part 151a of the display unit 151 and a first rear part 1012 located on a rear side of the mobile terminal 100. The first rear part 1012 may include a first backside 1012a always exposed externally and a second backside 1012b exposed externally in an extended state only. As shown in FIG. 3, the second backside 1012b is not externally exposed in the first state by being covered with a rear cover 1025 of the second frame 102 but is externally exposed in the second state.

The second frame 102 includes a second front part 1021 located on the front side and a second rear part 1022 located on the rear side of the mobile terminal 100. The second front part 1021 is located on the backside of the first front part 1011 in the first state or withdrawn in the second state from the first front part 100 in the first direction.

The second front part 1021 may be made of a metal material and function as a ground, and is referred to hereinafter as ground metal 1021 to indicate its functional aspect. The second rear part 1022 covers the back side of the battery 191, and may be positioned between the rolling hinge 104 and the battery 191. The second rear part may be referred to as a battery cover 1022. The rolling hinge 104 is moved in a space between the second rear part and the rear cover 1025, and the battery cover 1022 may be omitted where the both ends of the rolling hinge 104 are located.

The display unit 151 may not be fixed to the second frame 102 but a position on the second frame 102 may be variable in response to a slide movement of the second frame 102. The variable part 151b of the display unit 151 is located on the backside and lateral side of the second frame 102 in the first state of the mobile terminal 100. The variable part 151b located on the backside moves to the front side of the second frame 102 in the second state.

The ground metal 1021 supports the variable part 151b having moved to the front side in the second state, and the battery cover 1022 supports the variable part 151b having moved to the rear side in the first state.

The slide frame 1047 connected to the end portion of the display unit 151 to enable the display unit 151 to slide to move moves on the backside of the rear part 1022. The display unit 151 coupled to the slide frame 1047 is sliding in response to a movement of the slide frame 1047. The slide frame is disposed to face the backside direction of the mobile terminal 100 at all times. Since the moving part does not move to the front side, it may restrict a front side area of the display unit 151 and fix the variable part 151b having moved to the front side to maintain a flat state by pulling on the variable part 151b.

The second frame 102 may further include a rear cover 1025 covering the variable part 151b located on the backside of the battery cover 1022. If the end portion of the display unit 151, i.e., the moving part is exposed externally, the display unit 151 may be broken possibly. The rear cove r 1025 may prevent the rear side of the display unit 151 from being externally exposed in direct. The battery cover 1022 may include a guide member (not shown) guiding a slide movement of the slide frame 1047 moving on the backside of the battery cover 1022, and the rear cover 1025 may cover the guide member not to be exposed externally.

The rear cover 102 may be formed of opaque substance or contain transparent substance. The transparent rear cover 1025 may provide a user with information using the display unit 151 located on the backside in the first state.

For example, when a user takes a shot in a user-standing direction using a camera located in rear, the user may watch a preview image of the camera via the display unit 151. In case that the mobile terminal 100 is placed in a manner that a backside direction faces upward, an alarm and the like may be provided via the display unit 151 located on the backside.

Yet, since the battery cover 1022 may be visually exposed through the rear cover 1025 in the second state, it may perform coating (or tinting) for lowering transmittance to make an interior only viewable if the display unit 151 is turned on, i.e., light is projected from an inside The rear cover 1025 may cover the second backside 1012b of the first frame 101 by being extended in the second direction from a portion that covers the rear part of the display unit 151. As shown in FIG. 3 (a), the rear cover 1025 may form a backside exterior of the mobile terminal 100 in the first state while covering the second backside 1012b in the first state together with the first backside 1012a.

As shown in FIG. 3 (b), if switching to the second state, the second backside 1012b is exposed through the backside. To prevent the components inside the mobile terminal 100 from being exposed, as shown in FIG. 7 (b), the second backside 1012b and the rear cover 1025 overlap each other at least in part even in the second state.

Referring to FIG. 7 (a), the second backside 1012b and the rear part 151b of the display unit 151 of the present disclosure may be disposed to neighbor each other in the first direction without overlapping with each other. In case that the second backside 1012b and the display unit 151 are disposed to overlap each other, the second backside 1012b should be recessed into the mobile terminal 100 by the thickness of the display unit 151, the rolling hinge 104 and the battery cover 1022.

In this case, as an installation space within the first frame 101 is reduced and a step difference between the first backside 1012a and the second backside 1012b is significant, a user may feel sense of difference when holding the extended mobile terminal 100.

Therefore, according to the present disclosure, the display unit 151 and the battery cover 1022 are disposed in top and bottom directions, respectively, and a portion externally exposed by being extended in the second state and a portion at which the display unit 151 is located in the first state may be separated in the first direction.

An extended part of the rear cover 1025 covering the second backside 1012a in the first state covers the inner components exposed in response to the movement of the battery cover 1022 in the second state. The second backside 1012a may cover the backside of the first frame 101 exposed in response to the movement of the rear cover 1025, and a first direction length of the second backside 1012b may have a length equal to or greater than a moving distance of the second frame 102.

The mobile terminal 100 of the present disclosure includes frames 101 and 102 in which components are mounted, and the frames 101 and 102 of the present disclosure may vary in size in the first direction as shown in FIG. 2. One or more frames 101 and 102 move relative to each other, and sizes thereof may vary in the first direction. Electronic components are mounted in the frames 101 and 102, and the flexible display unit 151 is located out of the frames 101 and 102.

Since the mobile terminal 100 of the present disclosure includes the flexible display unit 151, the flexible display unit 151 may be combined in a form surrounding front faces and rear faces of the frames 101 and 102. The frame may include the first frame 101 and the second frame 102 moving in the first direction with respect to the first frame 101. The first frame 101 and the second frame 102 include front portions, a rear portions, and side portions, respectively, and are coupled to each other.

First, the first frame 101 may correspond to a main body of the mobile terminal 100, and may define a space for accommodating therein various parts between the first front portion 1011 and the first rear portion 1012. In addition, the first frame 101 may accommodate the second frame 102 movably coupled to the first frame 101 in such a space. More specifically, the first frame 101 may include the first front portion 1011 disposed at a front portion of the mobile terminal 100 to support a front surface of the display unit 151, and the first rear portion 1012 disposed on a rear surface of the mobile terminal and equipped with various parts.

Such first front portion 1011 and first rear portion 1012 may be spaced apart from each other at a predetermined spacing to defined the predetermined space therebetween, and may be connected to each other by a first side portion 1013. The first side portion 1013 may be formed integrally with the first rear portion 1012 or the first front portion 1011. The camera 121, the audio output module 152, an input/output terminal and the controller 180 may be accommodated in the space within the first frame 101 as the parts of the mobile terminal 100. For example, the controller 180 may become the main board 181 including a processor and electronic circuit controlling operations of the mobile terminal 100.

The battery 191, which plays a role as the power supply unit 190, occupies the largest area of the mobile terminal 100. As the mobile terminal 100 includes more components, and more particularly, a time of using the display unit 151 increases, capacity of the battery 191 becomes more significant. Hence, a size of the battery 191 tends to increase despite downsizing other components. Although a space occupied by the battery 191 is large, since the battery 191 is heavy, the center of gravity of the mobile terminal 100 may change depending on a location of the battery 191.

As shown in FIG. 7, according to the present embodiment, the battery 191 is disposed in the second frame 102, thereby minimizing the shift of center of gravity when the mobile terminal 100 is extended. In case that the battery 191 is also installed in the first frame 101, the center of gravity seems almost similar to a slide moving distance of the frame 101 and 102. Yet, in case of the present embodiment, as weight is distributed to the first frame 101 and the second frame 102, the center of gravity may be located at a middle portion of an extended state. If the battery 191 is located in the first frame 101 like the embodiment shown in FIG. 5, since an inside of the second frame 101 includes an empty space in the extended state of the mobile terminal 100, it causes a problem that a backside bearing power of the variable part 151b is weak. Although the support bars of the rolling hinge 104 located on the backside of the variable part 151b and the ground metal 1021 may support the variable part 151b, as the bearing power is limited, if a considerable force is applied to the front side, flex deformation may occur.

In addition, the battery 191 is disposed between the ground metal 1021 and the battery cover 22 of the second frame 102, thereby supporting the backside of the variable part 151b having moved to the front side of the mobile terminal 100. If the battery 191 is located on the backside of the ground metal 1021, the variable part 151b having moved to the front side may maintain a flat state.

Referring to FIG. 3, a lateral part of the first frame 101 may include a first lateral side 1013a exposed at all times and a second lateral side 1013b exposed selectively. A second lateral part 1023 forming a lateral side of the second frame 102 covers the second lateral side 1013b in the first state or exposes the second lateral side 1013b in the second state.

The second lateral side 1013b is located at a portion exposed externally in the second state only and may minimize a section overlapping with the second lateral part 1023 of the second frame 102.

In an inner space of the second lateral part 1023 failing to overlap with the second lateral side 1013b, guide rails 231 and 232 guiding slide movements of the frames 101 and 102, an auxiliary board 183 connected components of the second frame 102 and the like may be disposed. The first lateral side 1013a and the second lateral side 1013b are located between the first front part 1011 and the first and second backsides 1012a and 1012b, thereby forming an inner space of the first frame 101. Since the first lateral side 1013a is exposed externally at all times, it may implement an antenna and the like. An SIM card tray slot 162 and the like, which need not be exposed at all times, may be disposed on the second lateral side 1013b.

The second lateral part 1023 may form a component installation space inside together with the ground metal 1021 and the battery cover 1022 and also form an exterior of the mobile terminal 100 together with the rear cover 1025. As shown in FIG. 3, the second lateral part 1023 may have the same height of the rear cover 1025. A front bezel 1014 enclosing a front circumference of the display unit 151 may be further included. The front bezel 1014 fixes the end portion of the display unit 151 to the first frame 101 and the second frame 102.

The front bezel 1014 may include a first bezel neighboring the first lateral side 1013a of the first frame and a second bezel neighboring the second lateral part 1023 of the second frame. In the first state, as shown in FIG. 2 (a), the first and second bezels may be connected to each other. In the second state, as shown in FIG. 2 (b), the first bezel and the second bezel may be spaced apart from each other.

Figure 9:
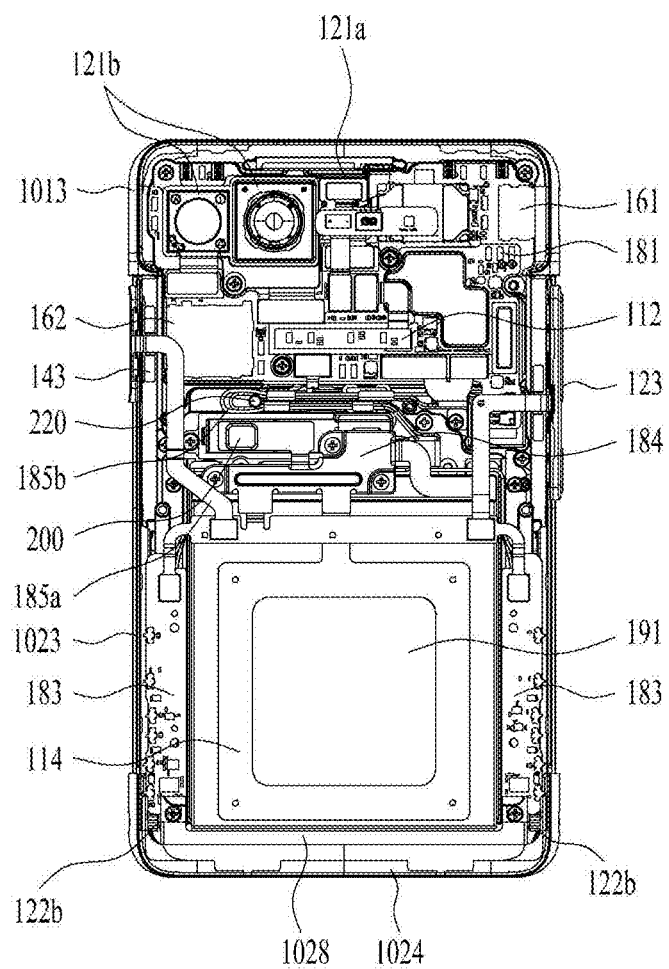
FIG. 9 and FIG. 10 are diagrams showing inner components in a first state and a second state, respectively.
Figure 10:
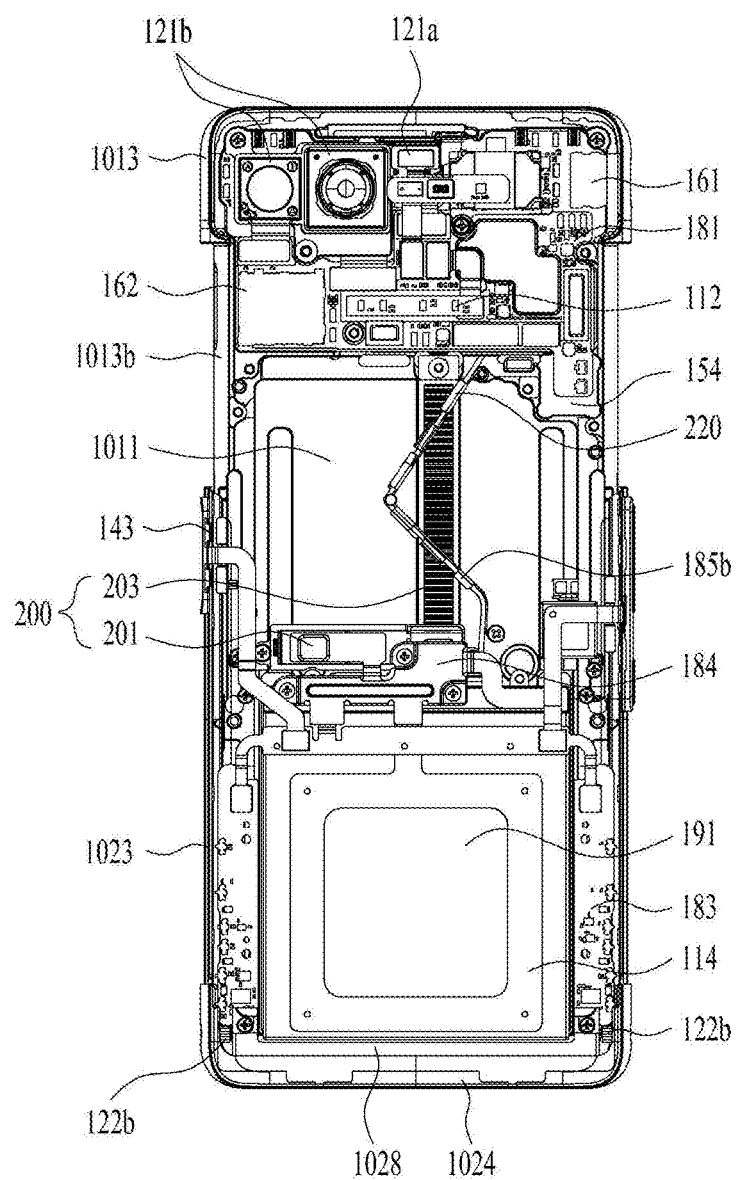

FIG. 9 and FIG. 10 are diagrams showing inner components in the first state and the second state of the mobile terminal 100, respectively. in a manner of removing the display unit 151, the rear part 1012 and 1022 and the rear cover 1025, which cover the backsides of the display unit 151 and the mobile terminal 100, FIG. 9 and FIG. 10 show the first state and the second state, respectively. The main board 181, the battery 191, the cameras 121a and 121b, the vibration module 154, the microphone 122a, the audio output module 152, the rack gear 203 of the drive unit 200 and the like are installed in the first frame 101. The battery 191, the user input unit, the coil antenna 114, the mobile communication antenna 112, the microphone 122b, the motor 201 and pinion gear (not shown) of the drive unit 200 and the like may be installed in the second frame 102.

The main board 181 may be located in the first frame 101, and cameras 121a and 121b, a vibration module 154, interface units 161 and 162, an antenna 112b and the like may be disposed in the first fame 101 in a manner of being mounted on the main board 181. The cameras may further include the front camera 121a facing the front side of the mobile terminal 100 as well as the main camera 121b facing the backside of the mobile terminal 100. For the disposition of the front camera 121a, a partially deactivated area may be included in the top end of the display unit 151.

A cable terminal 161 for charging or data transmission may be located on the first lateral side 1013a to be available even in the first state of the mobile terminal 100. A card mounting unit 162 for mounting a USIM or memory card thereon is not a normally removable part, and may be disposed adjacent to the second lateral side 1013b that is open only in the second state.

It may be able to implement a mobile communication antenna using the first lateral side 1013a, and an array antenna 112b for a signal of mm Wave may be disposed on the backside of the main board 181 to face the backside of the mobile terminal 100.

The drive unit 200 providing power for the slide movement between the first frame 101 and the second frame 102 includes a drive motor 201, a pinion gear (not shown) rotated by receiving a rotational force of the drive motor, and a rack gear 203 engaging with the pinion gear to make a rectilinear motion. The drive motor 201 and the rack gear 203 are coupled to different frames, respectively. According to the present embodiment, the drive motor 201 may be located in the second frame 102 and the rack gear 203 may be located at the pinion gear, and vice versa.

Yet, since a portion held by a user is a portion of the second frame 102, the drive motor 201 is located in the second frame 102 rather than the first frame 101 for the more stable driving of the drive motor 201.

The drive unit 200 may be located above the battery 191 for the stable slide movement while minimizing the short length of the rack gear 203. The drive unit 200 located above the battery 191 guides the slide movement in the middle portion of the mobile terminal 100 in the first direction, whereby the drive force may be stably transferred without being inclined to one side.

By disposing a location of the rack gear 203 to be adjacent to the middle portion of the mobile terminal 100 in the third direction, as shown in FIG. 10, the slide movement can be performed stably without inclination when the frames 101 and 102 slide to move.

The rack gear 203 of the drive unit 200 is disposed on the backside of the first front part 1011 to face the backside of the mobile terminal 100. In order that the rack gear 203 can be located in the second frame 102 in the first state, a slot extended in the first direction may be formed at a position corresponding to the rack gear 203 in the first front part 1011. In the first state, the rack gear 203 is disposed to overlap with the battery 191 installed in the second fame 102. In the second state, the rack gear 203 moves in the second direction along the first frame 101 and may be then extended to be located in an empty space.

According to the present embodiment, as the components are distributed in the first frame 101 and the second frame 102, the center of gravity is stable and the battery 191 advantageously supports the variable part 151b of the display unit 151. Yet, a signal connecting part 185b connecting the components installed in the first frame 101 to the components installed in the second fame 102 are required. The signal connecting part 185b may include electrical signals and power of the battery 191 and use substance deformable in response to movement of a frame.

The signal connecting part 185b may be configured using a Flexible Printed Circuit Board (FPCB) or a coaxial cable. If an antenna signal is externally affected, noise is generated. Hence, the signal connecting part 185b may use a coated coaxial cable.

The signal connecting part 185b may be bent between the first frame 101 and the second frame 102. As the signal connecting part 185b is bent, if the FPCB or coaxial cable is folded in a thickness direction of the mobile terminal 100 in the first state, radius of curvature of the bent portion is small. If a position of the bent portion varies depending on a movement of the frame, it may cause a problem of durability.

Therefore, the signal connecting part 185b of the present disclosure is disposed in the first direction of the mobile terminal 100 in the first state in a manner of overlapping. And, the bent portion of the signal connecting part 185b is widened in the second state, whereby the angle may change.

Figure 11:
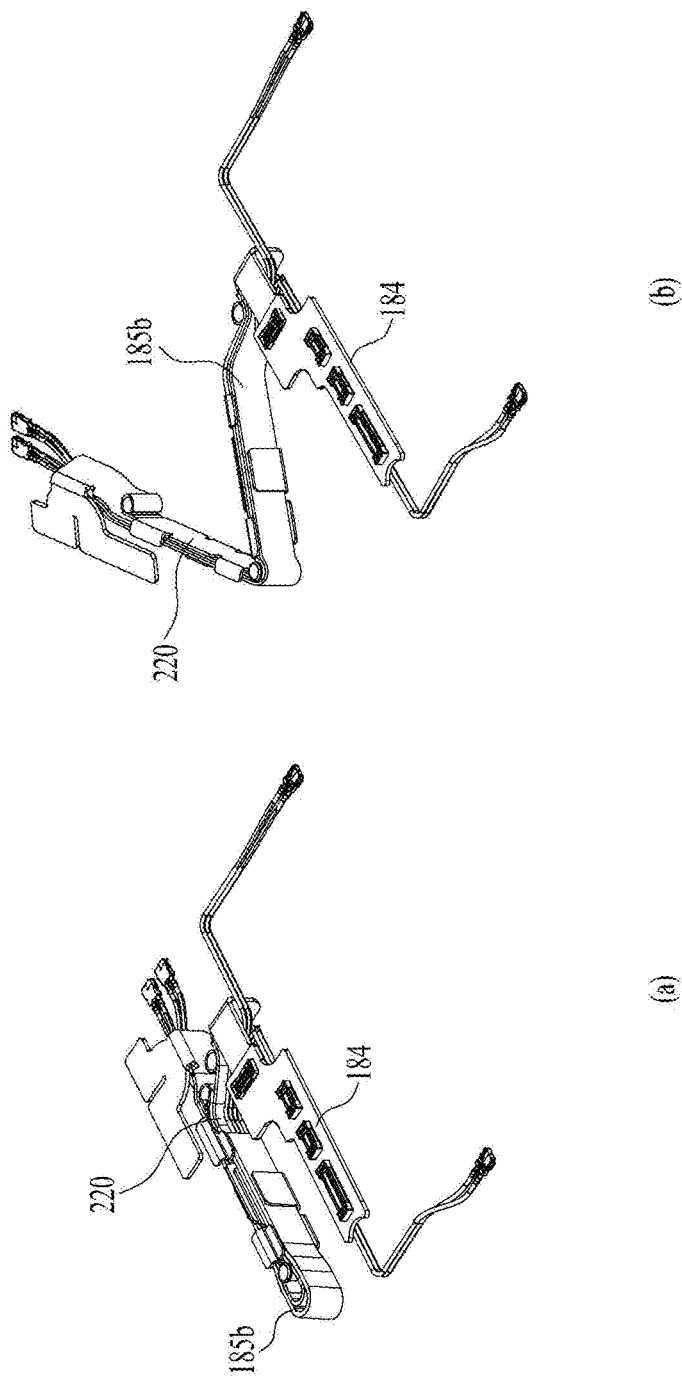
FIG. 11 is a diagram showing a signal connecting part and a support link installed inside a mobile terminal according to the present disclosure.

FIG. 11 is a diagram showing the signal connecting part 185b and the support link 220 installed in the mobile terminal 100 according to the present disclosure. Since an inside of an extended part according to the extension of the mobile terminal 100 is empty, if a pressure is applied by a strong force, flex deformation may occur. To support the empty space, a foldable support link 220 may be placed between the first frame 101 and the second frame 102.

The support link 220 includes a first link having one end coupled to the first frame 101 and a second link having one end coupled to the second frame 102. The other end of the first link and the other end of the second link are hinged together so that angles of the first and second links may vary in response to a slide movement of the frame. While the mobile terminal 100 is folded, as shown in FIG. 9, the first link and the second link may be disposed to touch each other in a manner that an angle between the two links becomes 0°.

While the mobile terminal 100 is extended, as shown in FIG. 10, the angle between the first and second links may be unfolded to have about 70°. If the two links are unfolded at 180°, it is difficult to fold then again. If the support link 220 is extended in the first direction, there may be a section that is not supported in the third direction. Therefore, to increase the bearing power in both of the first direction and the third direction that can be supported by the support link 220, an angle of the support link 220 may be configured to form about 90° in the second state.

As shown in FIG. 11, the link may be located between the first front part 1011 and the second backside 1012b in the thickness direction of the mobile terminal 100, and a thickness-directional width may have a width corresponding to a space between the first front part 1011 and the second backside 1012b.

The support link 220 guides the folding of the signal connecting part 185b as well as supports the empty space within the frame due to the extension of the mobile terminal 100. Since the signal connecting part 185b is formed of flexible substance, when the frame 101 and 102 slides to move, the signal connecting part 185b may be caught on the drive unit 200 or the frame 101 and 102 to as to be broken probably. The signal connecting part 185b may be coupled to the support link 220 so that its shape can change together with the support link 220, whereby the signal connecting part 185b may be prevented from being broken while sliding to move One side of the signal connecting part 185b may be connected to the main board 181 installed in the first frame 101, and the other side may include a middle board 184 collecting signals of components located in the second frame

102. The battery 191, the coil antenna 114, the microphone 122*b* and the antenna using the lateral part of the second frame 102 may be connected to the main board 181 through the middle board 184.

The coil antenna is located in a most backside direction of the mobile terminal 100, thereby enabling short-range wireless communication without signal interference from other components. Thus, as shown in FIG. 9, the coil antenna may be located on the backside of the battery 191.

A plurality of microphones 122*a* and 122*b* may be included for noise cancellation. The main microphone 122*b* is generally located at the center of a bottom part of the mobile terminal 100. Yet, in the present disclosure, as the bottom part of the mobile terminal 100 is a space for winding the display unit 151 therein, it is difficult to secure a microphone installation space and connect to the controller. Therefore, according to the present embodiment, the microphone 122*b* may be disposed on both sides adjacent to the second direction of the second frame 102 in a manner of avoiding the display unit 151.

The portion around which the display unit 151 is wound may include a rolling bracket 1028 having a curved surface corresponding to the curvature of the display unit 151. The rolling bracket 1028 is coupled to a first direction end portion of the second frame 102, and may include a roller (not shown) rotated to support the rotation of the display unit 151.

Figure 12:
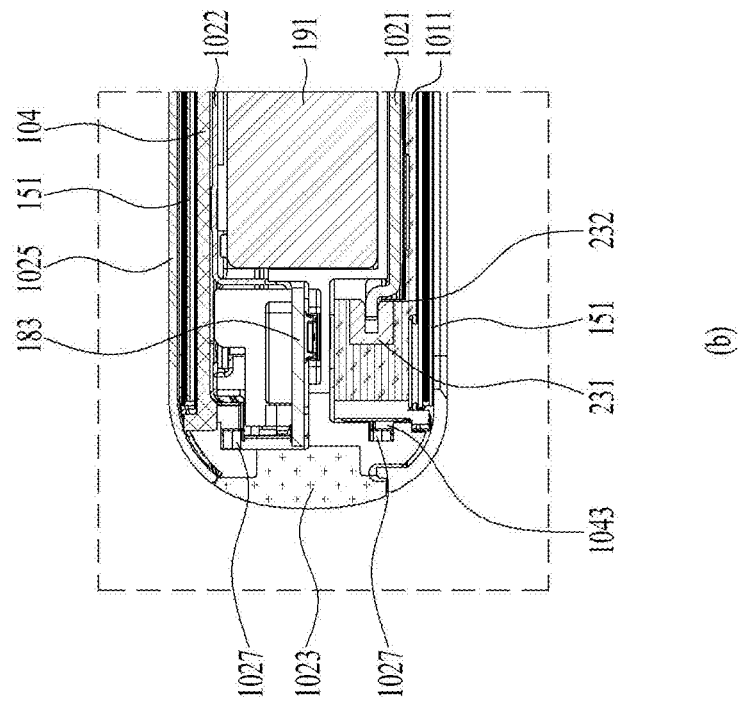
FIG. 12 is a diagram showing slide movements of first and ground metals and a linear guide of the present disclosure.
Figure 12:
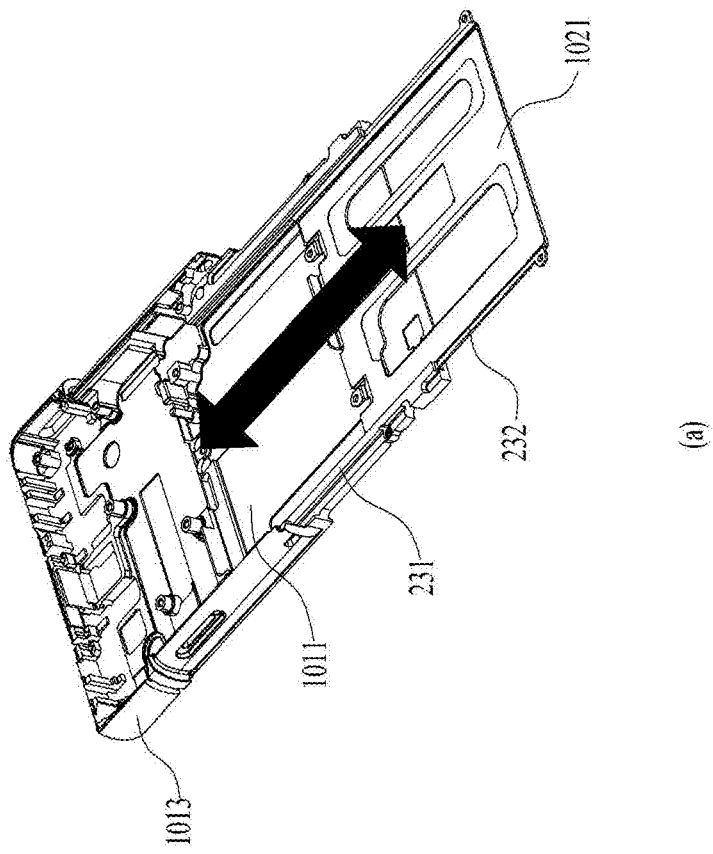

FIG. 12 (*a*) is a diagram showing the slide movements of the first and ground metals 1011 and 1021 and the linear guide 231 and 232, and FIG. 12 (*b*) is a cross-sectional diagram showing the location of the linear guide according to line C-C shown in FIG. 2.

The ground metal 1021 located on the backside of the first front part 1011 in the first state moves in the first direction and supports the backside of the variable part 151*b* having moved from the backside to the front side by being exposed from the first front part 1011. The rolling hinge 104 located on the backside of the variable part 151*b* may have the height corresponding to a step difference between the first front part 1011 and the ground metal 1021. A linear guide 231 and 232 may be further included to support the movements in the first and second directions by cutting off motions between the first and second frames 101 and 102 other than the first and second directions.

If a separate guide member is attached to the first and second frames 101 and 102 as a linear guide, it may be externally exposed when the mobile terminal 100 is extended, thereby causing a problem of increasing a volume occupied within the mobile terminal 100.

To minimize the volume occupied within the mobile terminal 100 and cut off the motion of the frame in the third direction, as shown in FIG. 12 (*b*), a linear guide 231 and 232 configured with a pair of guide rails confronting each other in the third direction may be included.

As shown in FIG. 12 (*a*), the lateral part of the first frame 101 includes a first lateral side 1013*a* exposed externally at all times and a second lateral side 1013*b* exposed externally only in the second state, and a portion blocked by the second lateral part 1023 of the second frame 102 omits a lateral part even in the second state. Instead, the linear guide 231 and 232 may be disposed by utilizing this space.

Referring to FIG. 12 (*b*), the first guide rail 231 coupled to the first front part 1011 and the second guide rail 232 located at the end portion of the ground metal 1021 may be disposed in a manner of confronting each other in the third direction. The first guide rail 231 may include a groove extended in the first direction by enclosing the second guide rail 232. The second guide rail 232 may use the end portion of the ground metal 1021 as it is, and the first guide rail 231 may include a groove in a width corresponding to the thickness of the ground metal 1021.

The first guide rail 231 contains POM substance. As direct inter-metal friction is avoided, abrasion of the linear guide 231 and 232 is minimized and a slide movement of the frame can be performed smoothly.

The linear guide 231 and 232 of the present embodiment is illustrated as containing POM in a manner that the first guide rail 231 encloses the second guide rail 232. On the contrary, the linear guide may include a first guide rail 231 in a plate shape and a second guide rail 232 containing the POM that encloses the first guide rail 231. In addition, as shown in FIG. 12 (*b*), the second guide rail 232 may be located within the battery cover 1022 or the second lateral part 1023 as well as the ground metal 1021.

Figure 13:
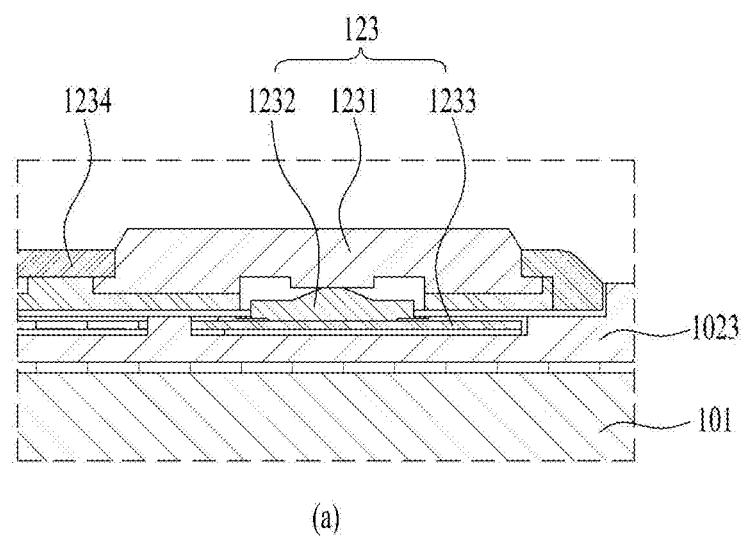
FIGS. 13 and 14 are diagrams showing a user input unit according to an embodiment of a mobile terminal.
Figure 13:
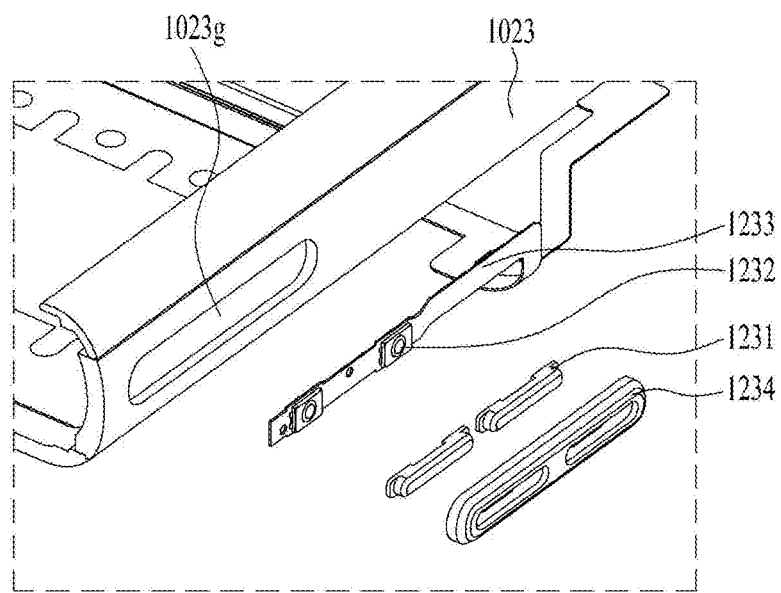
Figure 14:
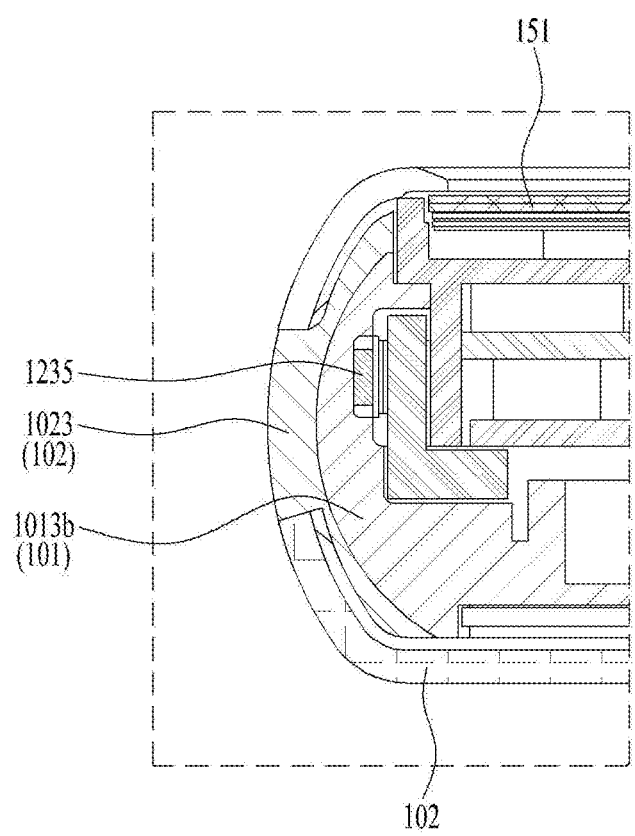

FIGS. 13 and 14 are diagrams showing the user input unit 123 according to an embodiment of a mobile terminal. As the size of the display unit 151 on the front surface of the mobile terminal 100 increases, the space for adding the user input unit 123 other than a touchpad to the front surface becomes insufficient. Instead, a button may be implemented in the lateral direction of the mobile terminal 100.

An input through the touchpad of the display unit 151 is difficult for a key, such as a volume key, used in a state of not looking at the display unit 151, or a key, such as a power button, for activating the mobile terminal in a state that the display unit 151 is turned off. Thus, it is preferable for such key to receive an input through the physical user input unit 123.

It is inconvenient in terms of usability when the user input unit is located at a too high vertical level, so that it is preferable to dispose the user input unit at the location where the first side portion 1013 and the second side portion 1023 overlap each other. That is, the user input unit may be located in the second side portion 1023 or the user input unit may be located on the second side surface 1013*b* of the first side portion.

FIG. 13 shows an embodiment regarding the user input unit 123 located in the second side portion 1023, and FIG. 14 shows an embodiment regarding the user input unit 123 located on the second side surface 1013*b*.

The user input unit 123 in FIG. 13, which is the user input unit 123 implemented in the side portion of the second frame 102, may be seated by defining a groove 1023*g* in the side portion of the second frame 102. A switch board 1233 having a dome switch 1232 may be seated in the groove 1023*g* of the side portion, a top button 1231 may be overlapped with the dome switch 1232, and a button cover 1234 having a hole defined therein corresponding to the top button 1231 may be inserted into the side portion to fix the top button 1231.

When a thickness of the second side portion 1023 is increased, there is a problem in that a height difference between the first side surface 1013*a* and the second side surface 1013*b* increases. Thus, the button cover 1234 may be fixed at a location outward of the side portion to minimize the increase in the overall thickness of the second side portion 1023 of the second frame 102. When the second frame 102 moves in the first direction, a location of the user input unit 123 of such type also changes in the first direction.

The user input unit 123 in FIG. 14 is positioned on the second side surface 1013*b* of the first side portion 1013 of the first frame 101. Because the second side surface 1013*b* is covered by the second side portion 1023 of the second frame, it is difficult to apply the user input unit 123 using the dome switch as in the embodiment in FIG. 13.

Instead, a user input unit may be implemented using a force sensor 1235. The force sensor 1235 is also referred to as a force touch and operates by recognizing a pressing force. As a sensor that generates an electrical signal in response to a minute mechanical change, the force sensor 1235 may sense changes in a range from several um to tens of um on an attached surface.

The force sensor 1235 does not need to be directly exposed to the outside, so that, even when the force sensor 1235 is located inward of the first side portion 1013, the force sensor 1235 may sense a pressure applied to an outer surface of the second side portion 1023. Deformation with a magnitude equal to or greater than a predetermined magnitude may be sensed as a user input and distinguished from a touch input occurring at a time of simple gripping.

Because the second side portion moves during the extension in the second state to expose the second side surface 1023b of the first side portion, a distance from a top of the user input unit may be kept the same as in the first state.

Figure 15:
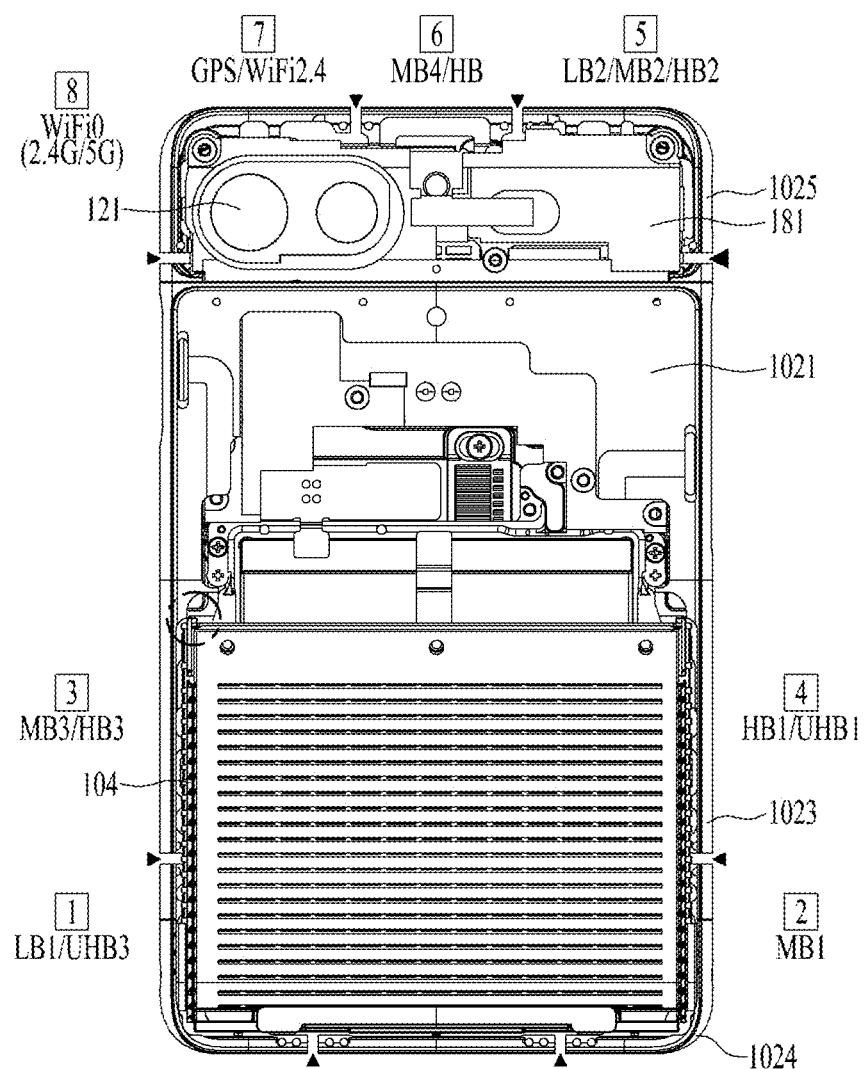
FIG. 15 is a diagram illustrating the arrangement of an antenna using a side metal of a mobile terminal.

FIG. 15 is a diagram illustrating antenna arrangement using side metals of the mobile terminal 100. The first side portion, the second side portion, and the bottom frame 1024 may define the appearance of the side of the mobile terminal, and may include side metals made of metal.

Slits compartmentalizing the side metals of a predetermined length are located between the multiple side metals. An insulating material may be injected into the slits to form an injection portion. The injection portion may be located on an inner side of the side metal as well as the slits.

The side metal may be utilized as an antenna that is connected to the first front part or the second front part (ground metal), which is partially located inside, to be grounded and connected to the wireless communication unit 110 to radiate a signal. The second side portion 1013b of the first side portion, which overlaps the second side portion and is located inside, is difficult to utilize as an antenna. Also, when a user holds the mobile terminal 100, the left and right sides of the mobile terminal 100 come into contact with the user's hand, and are thus difficult to utilize as an antenna.

Considering the overlapping of the two frames 101 and 102 and how the mobile terminal is held in the user's hand, the side metals 10231 and 10232 located at the top and bottom of the mobile terminal 100 may be utilized as antennas, as shown in FIG. 15.

Since antennas for LTE mobile communication utilize different frequency bands by country or communication service provider, a plurality of antennas may be provided to operate in various frequency bands (LB, MB, HB), and one antenna can transmit and receive two or more signals in a signal band without interference. In addition to LTE, ultra-high band (UHB) signals with wavelengths in the centimeter range can be used for 5G antennas.

Although not shown in the drawings, an array antenna may be provided to radiate signals in the mm wavelength band. In addition to mobile communication, a Wi-Fi antenna, a GPS antenna, and the like may be provided.

Figure 16:
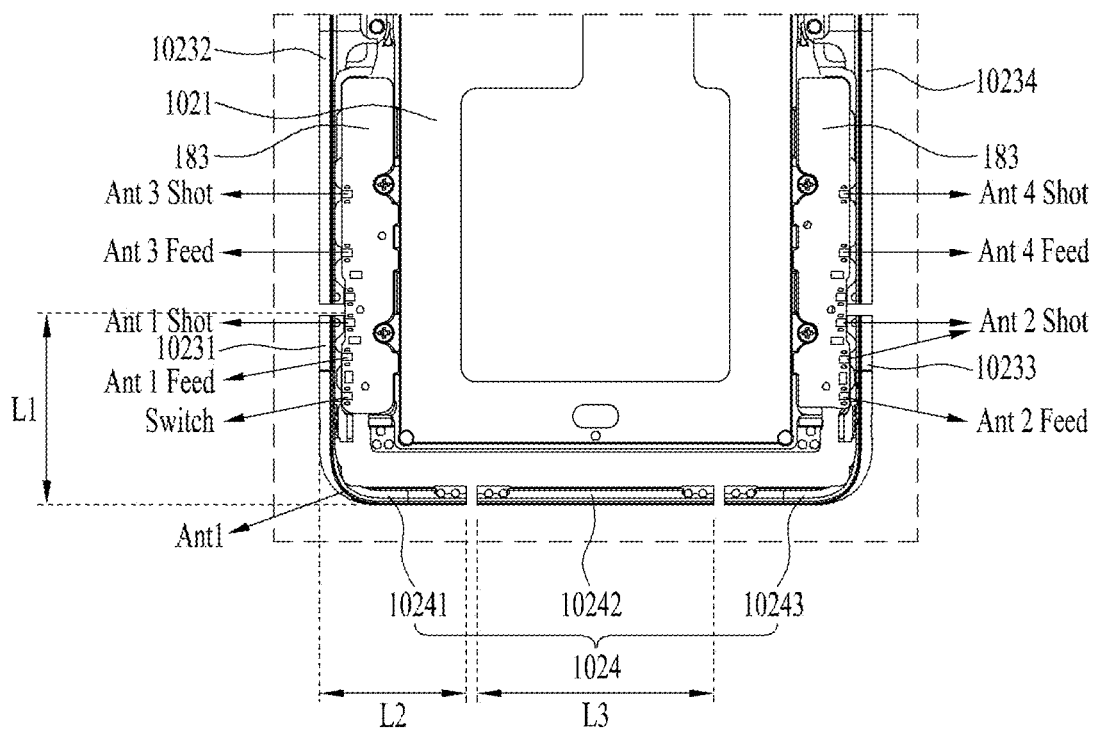
FIG. 16 is a diagram illustrating the arrangement of an antenna using a side metal located on a second frame and the connection of the antenna.

In this embodiment, four antennas are implemented on the top and four antennas are implemented on the bottom, using side metal on the lateral surface. The number of side metals may not be increased to the required number of antennas due to spatial constraints of the side portion and constraints on the number of slits. In this case, antennas may be implemented by forming a conductive pattern on the substrate or on the inner lateral surface of the case to secure the insufficient number or length of antennas. FIG. 16 is a diagram illustrating the arrangement of antennas and their connections using side metal located on the second frame 102. FIG. 16 shows antennas located at the bottom among the antennas of FIG. 14.

The second side portion of the second frame 102 may include a side metal used as an antenna, wherein the side metal may be connected to a power supply unit and a ground part. The auxiliary board 183 may be located on an inner side of the second side portion 1023 to provide power and ground to the side metal. The auxiliary board 183 may be disposed on sides of the battery compartment, where the battery is seated, facing in the third and fourth directions, and may be connected to the main board located on the first frame via a signal connecting part.

However, since the display unit is located at the end of the second frame 102 facing in the first direction, the second side portion is located only on the sides of the ground metal 1021 facing in the third and fourth directions, as shown in FIG. 15. As a result, the side metals 10231 and 10233 located on the side facing in the first direction have a short length and are difficult to utilize as antennas.

Figure 17:
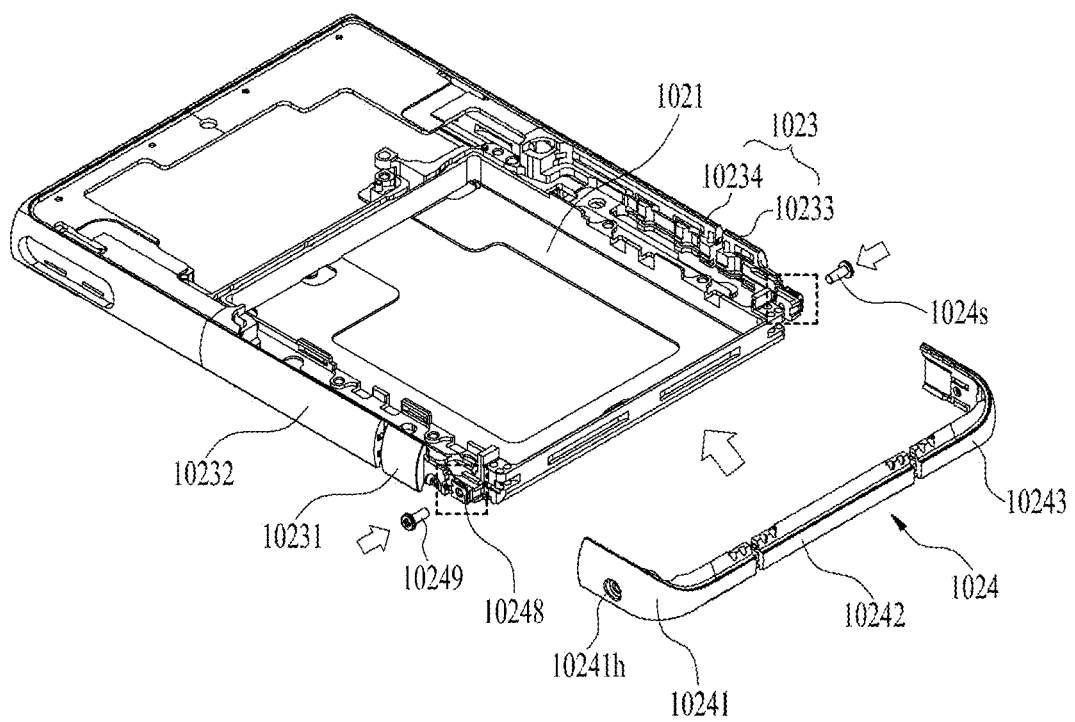
FIG. 17 is a diagram illustrating the fastening of a first side metal and a second side metal of the second frame.

To address the issue above, the second side metal 10241 of the bottom frame 1024 may be used to secure the length of the antenna. FIG. 17 is a diagram illustrating the fastening of the first side metal 10231 and the second side metal 10241 of the second frame 102.

The first side metal 10231 located on the second side portion and the second side metal 10241 located on the bottom frame 1024 are fastened by means of a screw 10249 and a connection clip 10248 may be provided for electrical connection of the first side metal 10231 and the second side metal 10241. The connection clip 10248 may include a clip portion welded to the first side metal 10231 and contacting the second side metal 10241, and the screw 10249 may be inserted to secure the connection clip 10248.

The first side metal 10231 and the second side metal 10241 may be physically connected by means of the screw 10249 and electrically connected by means of the connection clip, thereby constituting a first antenna Ant 1. The first antenna Ant 1 may be connected to the ground part, power supply unit, and switch of the auxiliary board 183 as shown in FIG. 15, and a signal in the low frequency band may be switched by the switch.

The first antenna Ant 1 may resonate not only at signals at low frequencies in the 0.8 GHz band, but also ay ultra-high frequency signals in the 3.5 GHz band, and thus may be used as a 5G antenna (See FIG. 24).

Figure 18:
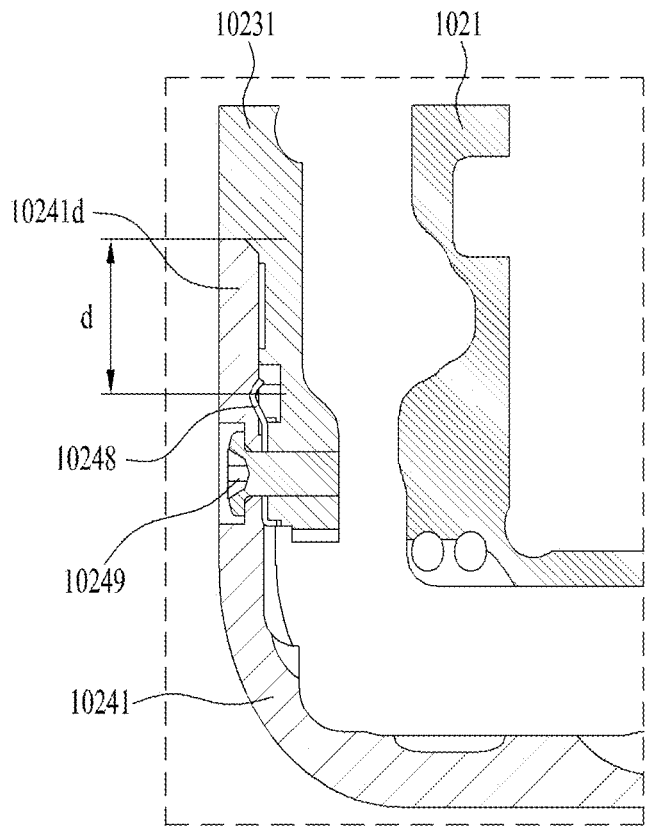
FIG. 18 is a diagram illustrating a first antenna formed by the first side metal and the second side metal.

FIG. 18 is a diagram illustrating the first antenna Ant 1 formed by the first side metal 10231 and the second side metal 10241. In the overlapping portion of the first side metal 10231 and the second side metal 10241, a single independent radiator 1024d may be realized from the connection clip 10248 to the end of the overlapping portion.

In order for this portion 1024d to avoid interference with the signal radiated through the first antenna Ant 1, its length should be very much less than a quarter of the wavelength of the maximum resonant frequency of the first antenna Ant 1. In this embodiment, the resonant frequency of the ultra-high frequency band of the first antenna Ant 1 is 3.5 GHZ, and the quarter-wavelength in free space of the signal of 3.5 GHz is 23 mm.

When implemented in an actual product, the first antenna is disposed adjacent to and in contact with other materials around it, rather than the free space, and thus the wavelength may vary depending on the permittivity (εr) of the surrounding materials. As shown in the equation in FIG. 17, in an actual product, the wavelength will be the length of the wavelength in free space multiplied by the reciprocal of the square root of the permittivity (εr).

For example, when the permittivity (εr) is 3, the quarter-wavelength resonating at 3.5 GHz on the product will be 13.3 mm. Since the length from the connection clip 10248 to the end of the overlapping portion 1024*d* is about 5 mm, its effect on the performance of the first antenna Ant 1 is negligible.

As shown in FIG. 16, the third side metal 10242 disposed adjacent to the second side metal 10241 is not used as an antenna. Since the display unit surrounds the end of the second frame in the first direction, it is difficult for the bottom frame 1024 and the interior of the second frame 102 to be directly connected. As a result, the third side metal is difficult to connect to the power supply unit. In addition, the third side metal 10242 may not be used as an antenna in consideration of interference between antennas configured by other neighboring side metals.

However, since the third side metal 10242 may affect the first antenna Ant 1, the length L3 of the third side metal 10242 may be set to be less than the length L1+L2 of the first antenna Ant 1 (L3<L1+L2).

Figure 19:
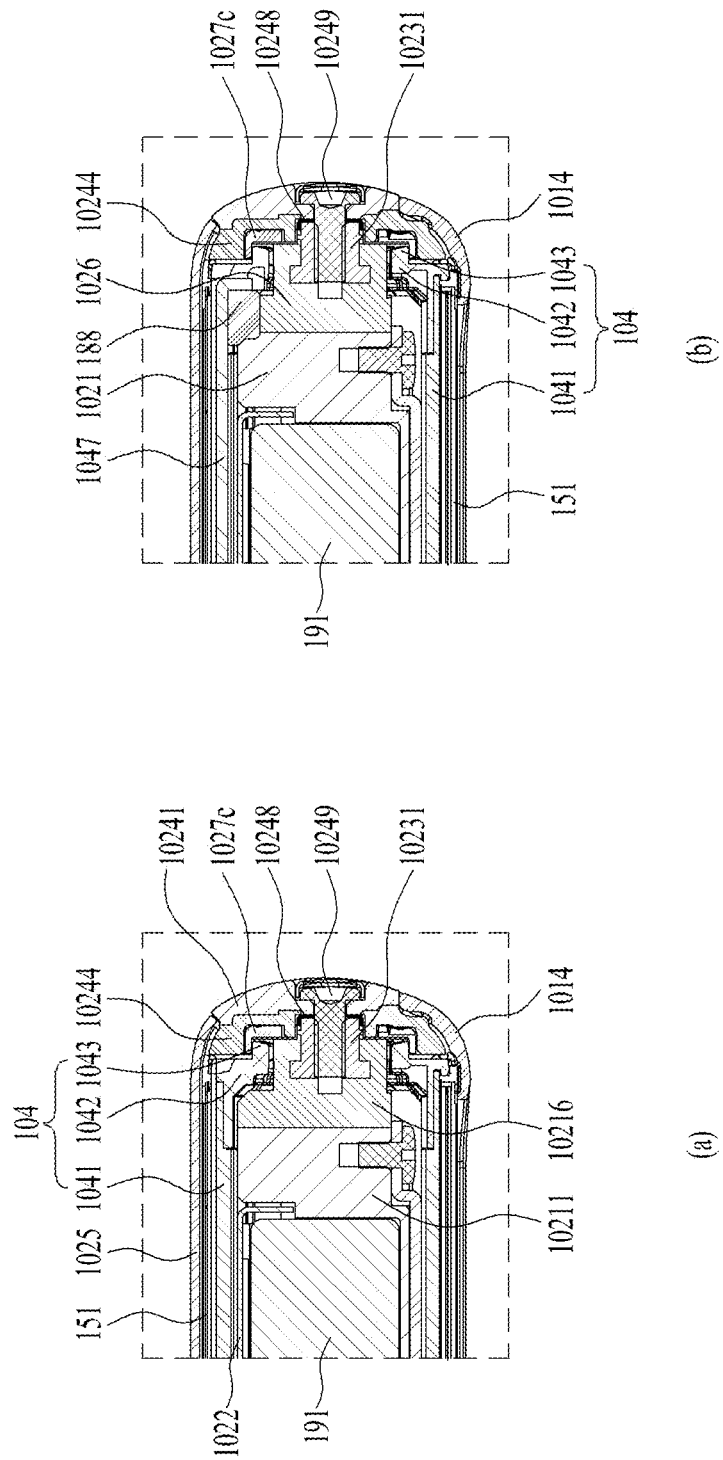
FIG. 19 shows cross-sectional views taken along lines D-D and E-E of FIG. 2.

FIG. 19 shows cross-sectional views taken along lines D-D and E-E of FIG. 2, illustrating a portion where the first side metal 10231 and the second side metal 10241 are coupled. In the figure, the top side is the backside, the bottom side is the front side, and the right side is the side facing in the third direction.

In FIG. 19, (a) shows the default mode and (b) shows the extended mode. As the variable part 151*b* and the rolling hinge 104, which are located on the backside in the default mode, are positioned on the front side, the slide frame 1047 is positioned as shown in (b) of FIG. 19.

The ground metal 1021 of the second frame 102 is spaced apart from the first side metal 10231 by a predetermined distance, and an injection portion 1026 may be interposed therebetween and be electrically separated from the first side metal 10231.

The bottom frame 1024 may include an injection portion 10244 positioned on an inner side of the second side metal 10241, and the second side metal 10241 may be exposed on the inner side of the injection portion to connect with the first side metal 10231.

The hinge edge 1042, located at an end of the metal bar 1041 of the rolling hinge 104, may be widened over the metal bar 1041. A portion of the hinge edge 1042 extending outwardly of the mobile terminal 100 covers an edge of the display unit 151, and a portion of the hinge edge extending inwardly is provided with a slide hook 1043.

A slide rail in which the slide hook 1043 is inserted is formed on the second side portion. To guide movement from the back to the front of the display unit 151, the slide rail may include a pair of straight rails spaced apart in the thickness direction of the mobile terminal and a curved rail (not shown) connected at the end facing in the first direction.

The slide rail is a portion of the rolling hinge 104 that contacts the slide hook 1043. If this portion is made of a metal material, friction may increase, making it difficult to drive the slide movement naturally. Therefore, the slide rail may include a non-metallic material and may employ a low friction material such as POM.

The slide rail may be formed by machining the injection portion 1026 located between the ground metal 1021 and the first side metal 10231 forming the second side portion. However, the curved rail 1027*c* may include a stiff material because it must support a force to unfold the display unit 151. The curved rails may be formed on the bottom frame 1024, and may be connected to the straight rails when the bottom frame 1024 is joined. The curved rails on the bottom frame 1024 may include a partially straight section for continuity with the straight rails.

Even when a conductive material such as metal is used for rigidity, the curved rail 1027*c* does not directly contact the second side metal 10241 and the first side metal 10231 due to the injection portion 10244 located on the inner side of the bottom frame 1024.

Figure 20:
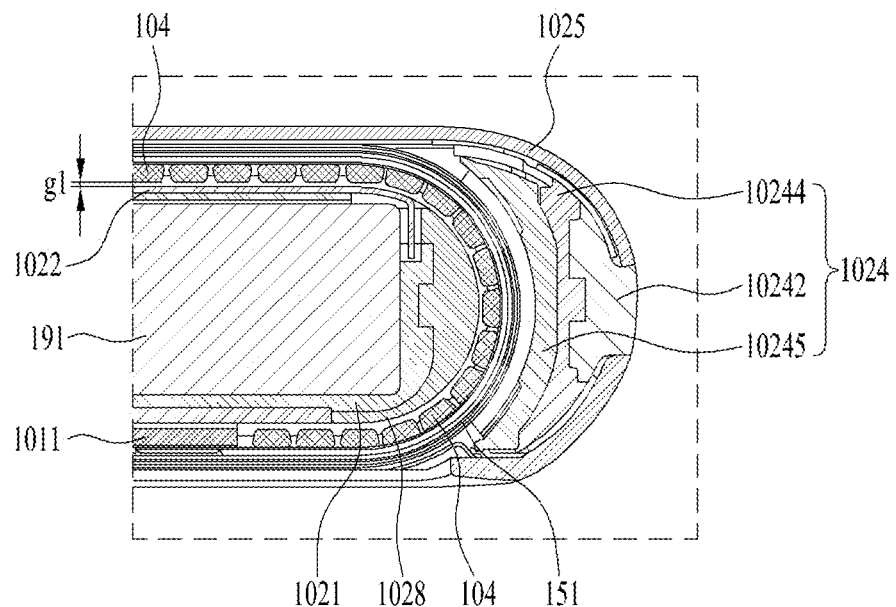
FIG. 20 shows cross-sectional views taken along lines F-F and G-G of FIG. 2.
Figure 20:
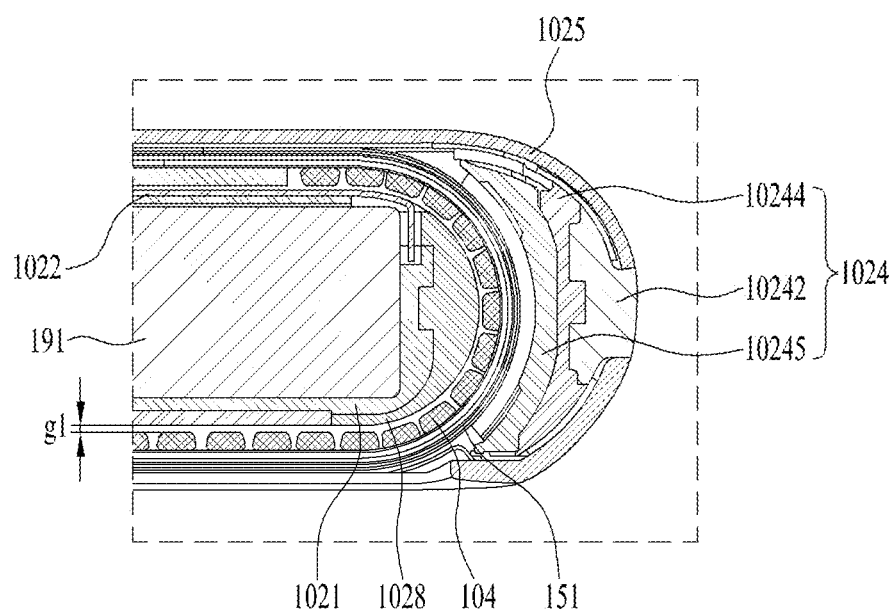
Figure 21:
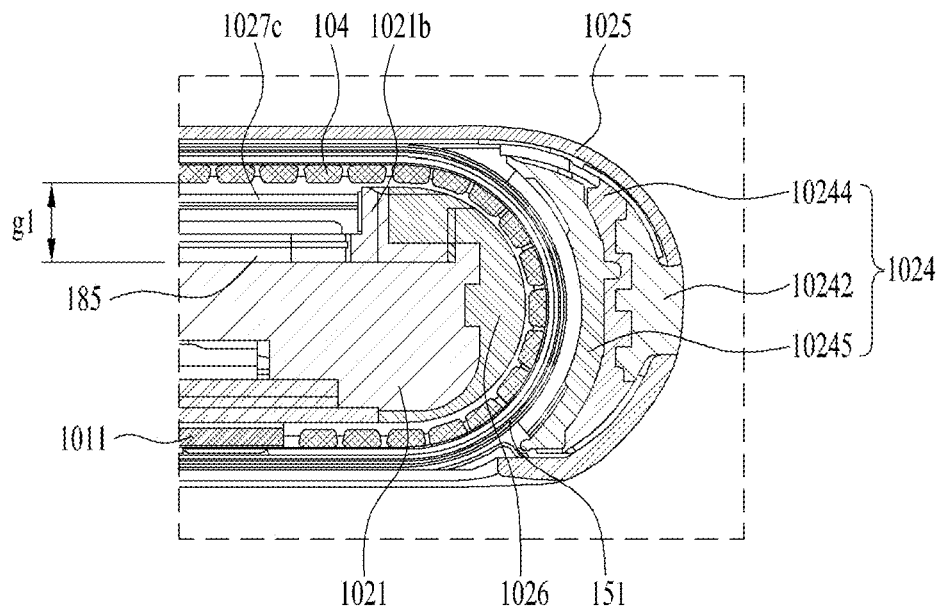
FIG. 21 shows cross-sectional views taken along lines H-H and I-I of FIG. 2.
Figure 21:
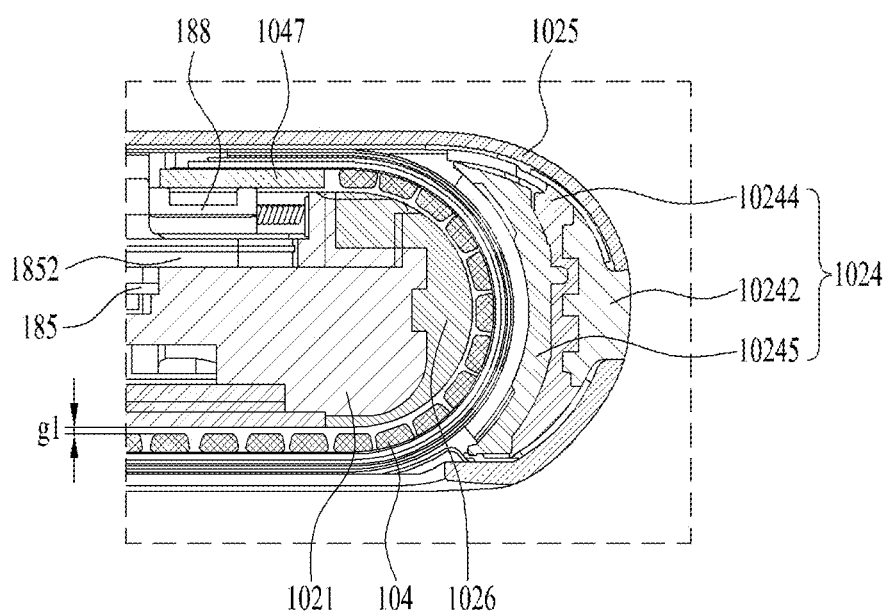

FIG. 20 shows cross-sectional views taken along lines F-F and G-G of FIG. 2, and FIG. 21 shows cross-sectional views taken along lines H-H and I-I of FIG. 2. In FIG. 20, which shows a cross-sectional view of the center portion of the mobile terminal, (a) shows the default mode and (b) shows the extended mode. FIG. 21 is a cross-sectional view of a portion adjacent to the side portion in the third direction of the mobile terminal, and the cross section in the fourth direction has a similar shape. In the figure, (a) shows a cross section in the default mode, and (b) shows a cross section in the extended mode.

FIGS. 20 and 21 are cross-sectional views of the end portion of the second frame 102 facing in the first direction. The figures show the variable portion at which the display unit 151 is bent and the multiple metal bars 1041 located on the back surface of the variable part.

Since the battery is located in the center portion of the second frame 102, a cross-section of the center portion is shown in FIG. 20, but the portion adjacent to the end facing in the third direction in FIG. 21 does not have the battery. The portions in FIG. 21 are spaces on the left and right sides of the battery, and the auxiliary board 183 is disposed therein in place of the battery.

The variable part of the display unit 151 may be disposed to mostly face the back of the mobile terminal in the default mode, and may be moved to the front in the extended mode. The position of the rolling hinge 104 varies depending on the change in the position of the variable part according to the mode of the mobile terminal. The rolling hinge 104 is disposed mostly on the back of the mobile terminal in the default mode, but is moved to the front in the extended mode.

As shown in FIG. 20, the metal bars 1041 are located on the back of the mobile terminal in the default mode, and are thus located on the back of the battery cover 1022. When they are moved to the front, they are positioned on the front of the ground metal 1021, which is positioned on the front of the battery.

FIG. 20 illustrates that the bottom frame 1024 bends from the front to the back of the display unit 151 to cover the side portion facing in the first direction. The bottom frame 1024 may include a second side metal 10241 and an injection portion 10244 positioned inside, and may further include an inner injection portion 10245 having a curved surface corresponding to the curved shape of the side portion of the display unit 151 and containing a flexible or soft material in contact with the side portion of the display unit 151. The inner injection portion 10245 may extend from both ends of the bottom frame 1024 in the second direction and may be omitted on a portion coupled to the second side portion of the second frame 102 (see FIG. 19).

The rolling hinge 104 may be disposed spaced apart from any other member, except for the slide hook 1043 at both ends, in consideration of the friction force generated during the slide movement. If the spacing gap is excessively large, the display unit 151 may be depressed when the display unit 151 is pressed, and the utilization of the internal space is deteriorated. Accordingly, the gaps g1 and g2 may be formed very small.

As shown in FIG. 20, the middle portion of the mobile terminal is spaced apart from the battery cover 1022 (conductive material) covering the back surface of the battery by a first gap g1, and is spaced apart from the ground metal 1021 by a second gap g2.

As shown in FIG. 21, there is no battery cover 1022 adjacent to the front of the rolling hinge 104, which is positioned on the back, as no battery is located in the adjacent position facing in the third direction. In the default mode, the gap between the rolling hinge 104 and the conductive material member of the second frame 102, i.e., a third gap g3 between the rolling hinge 104 and the ground metal 1021, is larger than the first gap g1 between the battery cover 1022 and the rolling hinge 104 in (a) of FIG. 20.

The third distance g3 between the rolling hinge 104 and the ground metal 1021 in the default mode is larger than the second distance g2 between the rolling hinge 104 and the ground metal 1021 located on the back side of the rolling hinge 104 in the extended mode.

When the two metals are spaced apart within a predetermined distance, they form a capacitor, which causes a charge to gather between them, thereby forming an electromagnetic field. The center portion of the mobile terminal 100 shown in FIG. 20 is spaced apart from the first antenna Ant 1 and has limited influence on the first antenna Ant 1. However, the formation of the electromagnetic field due to the narrow gap between the rolling hinge 104 at the end in the third direction adjacent to the first antenna and the conductive material (ground metal 1021) affects the first antenna Ant 1 (10231 and 10241).

As shown in (a) of FIG. 21, in the default mode, the gap g1 between the rolling hinge 104 and the ground metal 1021 is wide, and thus no electromagnetic fields affecting the antenna are generated. However, in the extended mode, as shown in (b) of FIG. 21, the rolling hinge 104 moves to the front and the gap g2 between the rolling hinge 104 and the ground metal 1021 becomes narrower, which may affect the performance of the first antenna Ant 1.

Since the first antenna Ant 1 may exhibit a change in performance between the default mode and the extended mode, the present disclosure may further include a ground pin 188 that brings the rolling hinge 104 and the ground metal 1021 into electrical contact to prevent a charge from gathering between the rolling hinge 104 and the ground metal 1021 in the extended mode.

Figure 22:
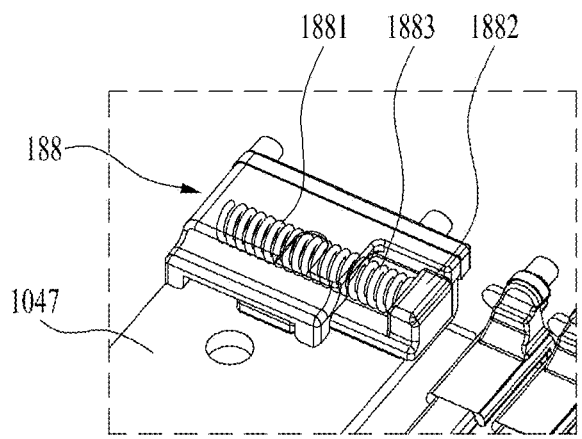
FIG. 22 is a diagram illustrating a ground pin.
Figure 22:
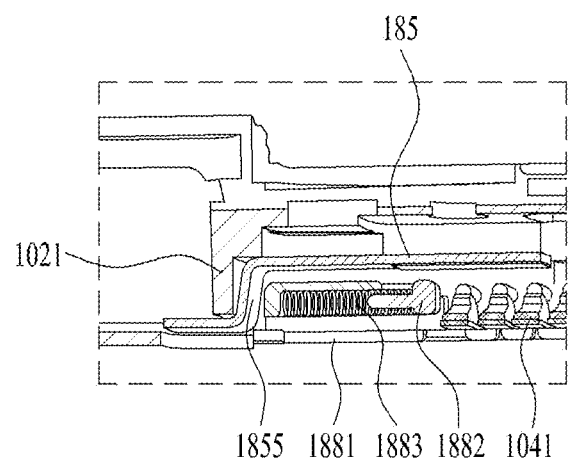

FIG. 22 is a diagram illustrating the ground pin 188, wherein (a) in FIG. 22 is a perspective view of a connector and (b) in FIG. 22 is a cross-sectional view of the connector. The ground pin 188 is a structure that electrically connects the rolling hinge 104 and the ground metal 1021, and may have a shape that does not contact the rolling hinge 104 during the slide movement of the rolling hinge 104 but comes into contact at the end of the slide movement so as not to affect the slide movement.

Therefore, rather than connecting in the thickness direction of the mobile terminal 100, it may have a structure that contacts at the end of the slide movement. The ground pin 188 of this embodiment may include an elastic part 1883 located on the rolling hinge 104 to maintain the connection.

One side of the elastic part 1883 may be coupled to the rolling hinge 104 and the other side thereof may contact the ground metal 1021 in the extended mode to electrically connect the rolling hinge 104 and the ground metal 1021. Thus, the entirety of the ground pin 188 may include a conductive material.

The ground pin 188 may be located at the front of the slide frame 1047 of the rolling hinge 104. Since the slide frame 1047 is always positioned on the backside of the mobile terminal, it is easy to dispose the ground pin 188. The ground pin 188 may be placed on both sides of the battery where the auxiliary board 183 is located to secure a space for the ground pin 188 to slide.

When switched to the extended mode, the display unit 151 moved to the front requires a pulling force toward the back to secure a flat state. As the slide frame 1047 comes into contact with a portion 1021b protruding from the ground metal 1021 to the backside, it restricts the movement of the display unit 151 to the front side in the extended mode.

When the protruding portion 1021b of the ground metal 1021 and the ground pin 188 come into contact in the extended mode, the elastic part may be compressed and the display unit 151 may be flattened by the elasticity of the elastic part 1883. At the same time, the connection between the ground and the rolling hinge 104 may be stably maintained.

Since the ground pin 188 is located at the end of the slide frame 1047 facing in the third direction, the slide hook 1043 of the rolling hinge 104 may protrude on the side of the ground pin 188 (see FIG. 4).

The portion of the ground metal 1021 that contacts the ground pin 188 in the default mode is provided with a flexible substrate 185 for connection to the auxiliary board 183, as shown in (b) of FIG. 22. The flexible substrate 185 is coated with an insulating material, and thus the flexible substrate 185 makes it difficult for the ground pin 188 to connect with the ground metal 1021 in the default mode.

In the default mode, the gap between the rolling hinge 104 and the ground metal 1021 has a limited effect on the performance of the antenna as described above. However, the gap between the rolling hinge 104 and the ground metal 1021 may be grounded for reliable operation even in the default mode.

To this end, the coating of the flexible substrate 185 which is the connecting part may be removed to expose the ground layer on the flexible substrate to bring the ground layer 1855 into contact with the ground pin 188. Alternatively, the flexible substrate may be repositioned such that the ground pin 188 contacts the ground metal 1021 even in the default mode.

Figure 23:
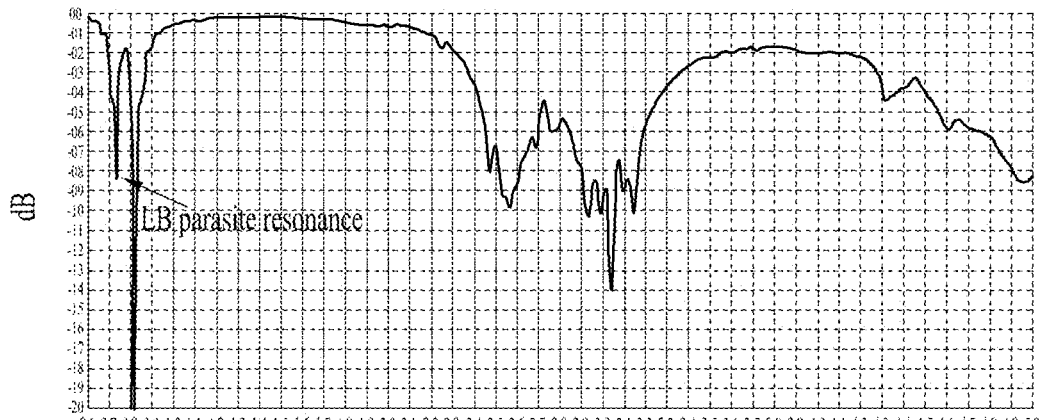
FIG. 23 is a graph depicting the performance of the first antenna with and without the ground pin.
Figure 23:
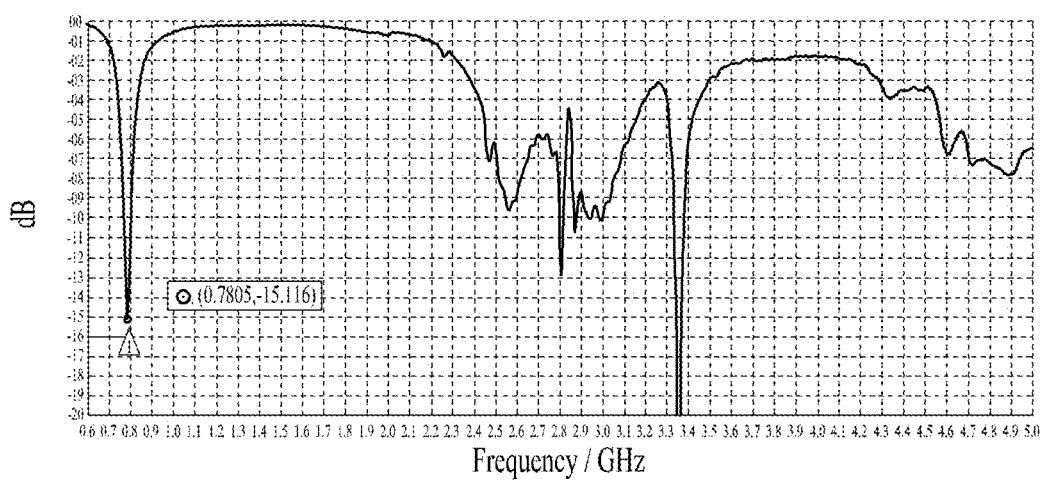

FIG. 23 is a graph depicting the performance of the first antenna Ant 1 with and without the ground pin 188. (a) is a graph depicting the performance of the first antenna Ant 1 without the ground pin 188. It can be seen that parasite resonance occurs in the low frequency band (0.8 GHz). With the ground pin 188, parasitic resonance does not occur as shown in (b), and thus the generation of noise in the signal in the low frequency band may be reduced.

In a mobile terminal according to one embodiment of the present disclosure, the antenna may be operated stably regardless of the state of the mobile terminal.

Further, the elastic part of the ground pin 188 may provide tension to keep the display unit 151 in a flat state in the extended mode.

In addition, as the mobile terminal 100 is extended, the internal parts are distributed instead of being concentrated on one side, which may reduce the shift of the center of gravity. Since the center of gravity does not shift upward, the user can use the mobile terminal stably even in the extended mode.

In addition, exposing parts of the mobile terminal to the extended part while the mobile terminal is extended may be minimized, thereby reducing foreign objects entering the interior.

In addition, when the mobile terminal is extended, usability may be improved by reducing the difference in level occurring on the exterior.

While the present disclosure has been described and illustrated herein with reference to the preferred embodiments of the mobile terminal 100 according to an embodiment of the present disclosure, the present disclosure is non-limited by the embodiments disclosed herein but intends to give a broadest scope matching the principles and new features disclosed herein. It will be appreciated by those skilled in the art that various modifications and variations can be made in the present specification without departing from the spirit or scope of the disclosure. Thus, it is intended that the present specification covers the modifications and variations of this disclosure provided they come within the scope of the appended claims and their equivalents.

What is claimed is:

1. A mobile terminal comprising:
 a first frame;
 a second frame slidably movable in a first direction with respect to the first frame to switch to an extended mode, or in a second direction to switch to a default mode, the second direction being opposite to the first direction;
 a display unit comprising a fixed part coupled to a front surface of the first frame and a variable part bending around the second frame;
 a rolling hinge coupled to a back surface of the variable part, the rolling hinge containing a conductive material;
 a ground pin coupled to the rolling hinge; and
 a wireless communication module configured to transmit and receive wireless signals,
 wherein the second frame comprises:
 a ground metal supporting a back surface of the rolling hinge;
 a first side metal defining an outer appearance in a third direction perpendicular to the first direction and a fourth direction opposite to the third direction; and
 a bottom frame covering a curved portion of the display unit, the bottom frame comprising a second side metal,
 wherein at least one of the first side metal and the second side metal is connected to the wireless communication module to transmit or receive the wireless signals,
 wherein the ground pin contacts the ground metal in the extended mode to electrically connect the rolling hinge and the ground metal.

2. The mobile terminal of claim 1, wherein the rolling hinge comprises:
 a plurality of metal bars extending in the third direction;
 a hinge edge disposed at both ends of each of the metal bars;
 a first slide hook protruding from the hinge edge;
 a rolling sheet disposed between the plurality of metal bars and the display unit; and
 an adhesive sheet disposed to attach the display unit to the rolling sheet,
 wherein the second frame further comprises:
 a slide rail disposed between the ground metal and the first side metal, the first slide hook being movably inserted into the slide rail,
 wherein the slide rail comprises a non-conductive material.

3. The mobile terminal of claim 2, wherein the slide rail comprises a POM material.

4. The mobile terminal of claim 2, wherein the adhesive sheet comprises an insulating material.

5. The mobile terminal of claim 2, wherein the rolling hinge comprises:
 a slide frame disposed at an end of the variable part to slidably move on a back surface of the second frame,
 wherein the ground pin is coupled to a front surface of the slide frame.

6. The mobile terminal of claim 5, further comprising:
 a second slide hook provided on one side of the ground pin to move along the slide rail.

7. The mobile terminal of claim 2, wherein the rolling sheet comprises a plurality of slits extending in the third direction,
 wherein a width of the slits increases at the curved portion of the display unit.

8. The mobile terminal of claim 1, wherein the ground pin comprises:
 an elastic part configured to be compressed when the ground pin contacts the ground metal in the extended mode.

9. The mobile terminal of claim 1, further comprising:
 a signal connecting part arranged to electrically connect a part mounted on the first frame and a part mounted on the second frame,
 wherein the ground pin contacts the signal connecting part in the default mode,
 wherein a coating on a surface of the signal connecting part in contact with the ground pin is removed.

10. The mobile terminal of claim 1, further comprising:
 a battery seated in the ground metal,
 wherein the ground pin is disposed on a side of the battery facing in the third direction.

11. The mobile terminal of claim 10, further comprising:
 an auxiliary board disposed on the side of the battery facing in the third direction,
 wherein the ground pin is disposed on a backside of the auxiliary board.

12. The mobile terminal of claim 11, wherein the ground metal comprises:
 a sliding metal disposed on the back surface of the rolling hinge in the extended mode;
 a board seat allowing the auxiliary board to be seated thereon; and
 a battery cover arranged to cover a back surface of the battery,
 wherein, a thicknesswise distance between the sliding metal and the rolling hinge is shorter than a thicknesswise distance between the board seat and the rolling hinge.

13. The mobile terminal of claim 1, further comprising:
 a screw passing through an overlap of the first side metal and the second side metal; and
 a connection clip disposed between the first side metal and the second side metal in the overlap,
 wherein the first side metal and the second side metal constitute a first antenna.

14. The mobile terminal of claim 13, wherein a distance from the connection clip to an end of the overlap is shorter than a quarter wavelength of a highest frequency signal among signals radiated by the first antenna.

15. The mobile terminal of claim 13, wherein the bottom frame further comprises:
 a third side metal compartmentalized by the second side metal and a slit,
 wherein a length of the third side metal is less than a length of the first antenna.

16. The mobile terminal of claim 13, wherein one end of the second side metal is disposed in the third direction and an opposite end of the second side metal is disposed in the first direction such that a corner of the mobile terminal is disposed.

\* \* \* \* \*